United States Patent
Wada et al.

(10) Patent No.: US 8,434,296 B2
(45) Date of Patent: May 7, 2013

(54) EXHAUST EMISSION CONTROL DEVICE FOR INTERNAL COMBUSTION ENGINE

(75) Inventors: Katsuji Wada, Saitama (JP); Shinya Ishimaru, Saitama (JP); Jun Iwamoto, Saitama (JP); Nobuhiro Komatsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 367 days.

(21) Appl. No.: 12/811,817

(22) PCT Filed: Nov. 18, 2008

(86) PCT No.: PCT/JP2008/070926
§ 371 (c)(1),
(2), (4) Date: Jul. 6, 2010

(87) PCT Pub. No.: WO2009/087818
PCT Pub. Date: Jul. 16, 2009

(65) Prior Publication Data
US 2010/0275581 A1 Nov. 4, 2010

(30) Foreign Application Priority Data

Jan. 8, 2008 (JP) .................. 2008-001695
Jan. 8, 2008 (JP) .................. 2008-001696
Jan. 8, 2008 (JP) .................. 2008-001700

(51) Int. Cl.
*F01N 3/36* (2006.01)
(52) U.S. Cl.
USPC .................. 60/285; 60/286; 60/289; 60/295; 60/300; 60/301; 60/303
(58) Field of Classification Search .................. 60/282, 60/284, 285, 286, 287, 289, 290, 295, 300, 60/301, 303, 307
See application file for complete search history.

(56) References Cited

U.S. PATENT DOCUMENTS

| 5,471,836 A | 12/1995 | Takeshima et al. |
| 5,473,887 A | 12/1995 | Takeshima et al. |

(Continued)

FOREIGN PATENT DOCUMENTS

| JP | 06-137138 | 5/1994 |
| JP | 08-210125 A | 8/1996 |

(Continued)

OTHER PUBLICATIONS

T.Tanaka et al., "Development of $NO_x$ Storage-Reduction Threeway Catalyst System," Collective Papers of Society of Automotive Engineers of Japan, Oct. 1995, vol. 26, No. 4.

(Continued)

*Primary Examiner* — Thomas Denion
*Assistant Examiner* — Jorge Leon, Jr.
(74) *Attorney, Agent, or Firm* — Arent Fox LLP

(57) ABSTRACT

Provided is an exhaust emission control device for an internal combustion engine capable of preventing NOx purification performance from degrading according to the operating condition. The exhaust emission control device comprises a NOx purification catalyst, a catalytic converter for continuously reducing the NOx in the exhaust emissions, a fuel reformer for reforming fuel to manufacture a reformed gas and supplying the reformed gas as the reducing gas from the upstream side of the NOx purification catalyst and the catalytic converter of the exhaust pipe, an operating condition detecting means for detecting the operating condition of an engine, and an enriching means for enriching the exhaust air-fuel ratio. The enriching means enriches the exhaust air-fuel ratio by supplying the reducing gas into the exhaust pipe by using the fuel reformer when the operating condition detected by the operating condition detecting means is a high-load operating condition.

21 Claims, 11 Drawing Sheets

U.S. PATENT DOCUMENTS

| | | | |
|---|---|---|---|
| 7,707,821 B1* | 5/2010 | Legare | 60/277 |
| 2004/0020447 A1* | 2/2004 | Taylor et al. | 123/3 |
| 2006/0201139 A1* | 9/2006 | Khadiya | 60/286 |
| 2006/0213187 A1* | 9/2006 | Kupe et al. | 60/286 |
| 2007/0012028 A1* | 1/2007 | Weissman et al. | 60/275 |
| 2007/0101698 A1* | 5/2007 | Goulette et al. | 60/284 |
| 2007/0101704 A1* | 5/2007 | Goulette et al. | 60/295 |
| 2007/0130915 A1* | 6/2007 | Beckmann et al. | 60/285 |
| 2007/0151232 A1* | 7/2007 | Dalla Betta et al. | 60/286 |
| 2007/0180819 A1* | 8/2007 | Sellnau et al. | 60/286 |
| 2007/0271908 A1* | 11/2007 | Hemingway et al. | 60/286 |
| 2007/0289291 A1* | 12/2007 | Rabinovich et al. | 60/286 |
| 2008/0016850 A1* | 1/2008 | Shamis et al. | 60/286 |
| 2008/0022657 A1* | 1/2008 | Pierpont et al. | 60/285 |
| 2008/0053073 A1* | 3/2008 | Kalyanaraman et al. | 60/286 |
| 2008/0060349 A1* | 3/2008 | Eyabi | 60/295 |

FOREIGN PATENT DOCUMENTS

| | | |
|---|---|---|
| JP | 8-210125 A | 8/1996 |
| JP | 2586738 B2 | 12/1996 |
| JP | 2600492 B2 | 1/1997 |
| JP | 2001-234737 B2 | 8/2001 |
| JP | 2002-054427 A | 2/2002 |
| JP | 2002-089240 A | 3/2002 |
| JP | 2004-068623 | 3/2004 |
| JP | 2004-218475 A | 8/2004 |
| JP | 2004-270587 | 9/2004 |
| JP | 2006-242020 A | 9/2006 |
| JP | 2007-046515 | 2/2007 |
| JP | 2007-313451 | 12/2007 |

OTHER PUBLICATIONS

N. Satoh et al., "A $NO_x$ Reduction System Using Ammonia Storage-Selective Catalytic Reduction in Rich and Lean Operations", 15 Aachener Kolloquium Fahrzeug- und Motorentechnik 2006, pp. 259-270.

Notice of Reasons for Rejection dated Nov. 20, 2012.

Notice of Reasons for Rejection issued to JP Application No. 2008-001695, mailed Aug. 28, 2012.

Notice of Allowance issued to JP Application No. 2008-001696, mailed Aug. 28, 2012.

* cited by examiner

EXHAUST EMISSION CONTROL DEVICE FOR INTERNAL COMBUSTION ENGINE

This application is a National Stage entry of International Application No. PCT/JP2008/070926, filed Nov. 18, 2008, which claims priority to Japanese Patent Application No. 2008-001695, filed Jan. 8, 2008; Japanese Patent Application No. 2008-001696, filed Jan. 8, 2008; and Japanese Patent Application No. 2008-001700, filed Jan. 8, 2008, the disclosure of the prior applications are incorporated in their entirety by reference.

TECHNICAL FIELD

The present invention relates to an exhaust purification device for an internal combustion engine. More specifically, it relates to an exhaust purification device for an internal combustion engine provided with a NOx purification catalyst that adsorbs or occludes NOx in exhaust, and that reduces the NOx thereby adsorbed or occluded.

In addition, in the present invention, the terminology "rich" indicates a ratio of air/fuel (hereinafter referred to as "air/fuel ratio") of fuel that is smaller than a stoichiometric air/fuel ratio, and the terminology "lean" indicates an air/fuel ratio of fuel that is larger than the above stoichiometric air/fuel ratio. Moreover, in the following explanation, a mass ratio of air and fuel in a mixed gas flowing into the engine is called an engine air/fuel ratio, and a mass ratio of air and combustible gas inside exhaust plumbing is called an exhaust air/fuel ratio.

BACKGROUND ART

Thus far, techniques have been known for purifying nitrogen oxides (hereinafter referred to as "NOx") contained in exhaust.

For example, in Patent Documents 1 and 2 and Non-patent Document 1, an exhaust purification device is shown that is provided with an oxidation catalyst and a NOx occlusion-reduction catalyst (hereinafter referred to as "LNT") in an exhaust channel. With this exhaust purification device, NOx in the exhaust having passed through the oxidation catalyst is occluded by reacting with an alkali metal, alkaline earth metal or the like during lean operation in which the exhaust is oxygen excessive, and the NOx thus occluded is reduced during rich operation in which the oxygen concentration of the exhaust is low. With this exhaust purification device, occlusion of NOx and reduction of NOx can be performed periodically by repeating lean operation and rich operation.

In addition, in Non-patent Document 2, for example, a method is shown in which NOx is adsorbed on a catalyst during lean operation in which the exhaust is oxygen excessive, then rich operation is performed and a state in which the oxygen concentration in the exhaust is low is periodically produced, while carbon monoxide is periodically synthesized and supplied, thereby periodically reducing the NOx adsorbed during lean operation.

More specifically, in the method shown in Non-patent Document 2, first, nitrogen monoxide and nitrogen dioxide existing in the exhaust is adsorbed to the catalyst during lean operation in which the exhaust is oxygen excessive, by way of the following formulas (1) to (3).

Next, rich operation is performed while carbon monoxide is synthesized. The carbon monoxide thereby synthesized produces hydrogen by way of the water-gas shift reaction shown in the following formula (4), in a situation where the oxygen partial pressure is low.

$$CO+H_2O \rightarrow H_2+CO_2 \tag{4}$$

Furthermore, ammonia is produced by reacting this hydrogen with carbon monoxide in a reducing atmosphere, and this ammonia is adsorbed to the catalyst by way of the following formula (5).

$$5H_2+2NO \rightarrow 2NH_3(adsorption)+2H_2O \tag{5}$$

With the ammonia produced by carbon monoxide according to the above as the final reducing agent, NOx in the exhaust or NOx adsorbed to the catalyst is reduced by way of the following formulas (6) to (8).

$$4NH_3+4NO+O_2 \rightarrow 4N_2+6H_2O \tag{6}$$

$$2NH_3+NO_2+NO \rightarrow 2N_2+3H_2O \tag{7}$$

$$8NH_3+6NO_2 \rightarrow 7N_2+12H_2O \tag{8}$$

Alternatively, in Patent Documents 3 and 4, for example, an exhaust purification system is shown that is provided with an LNT in the exhaust channel, and is further provided upstream of this LNT with a fuel reformer that produces a reducing gas containing hydrogen and carbon monoxide by reforming hydrocarbon fuel. In this exhaust purification system in particular, a fuel reformer is used that produces a reducing gas such that hydrogen is more abundant than carbon monoxide by volume ratio. According to this system, it becomes possible to selectively reduce the NOx in the exhaust by adding reducing gas containing hydrogen from an upstream side of the LNT into the exhaust.

Here, as a method of producing reducing gas from hydrocarbon fuel, for example, a partial oxidation reaction using oxygen as an oxidant has been known, as shown in the following formula (9), for example.

$$C_nH_m + \tfrac{1}{2}nO_2 \rightarrow nCO + \tfrac{1}{2}mH_2 \tag{9}$$

This partial oxidation reaction is an exothermic reaction using fuel and oxygen, and the reaction progresses spontaneously. As a result, once the reaction begins, hydrogen can be continuously produced without supplying heat from outside. In addition, in such a partial oxidation reaction, in a case of fuel and oxygen coming to coexist in a high temperature state, the combustion reaction as shown in the following formula (10) also progresses.

$$C_nH_m + (n+\tfrac{1}{4}m)O_2 \rightarrow nCO_2 + \tfrac{1}{2}mH_2O \tag{10}$$

Moreover, the steam reforming reaction, which uses steam as an oxidation, shown in the following formula (II) has been known.

$$C_nH_m + nH_2O \rightarrow nCO + (n+\tfrac{1}{2}m)H_2 \tag{11}$$

This steam reforming reaction is an endothermic reaction using fuel and steam, and is not a reaction that progresses spontaneously. As a result, the steam reforming reaction is an easily controlled reaction relative to the partial oxidation reaction described above. On the other hand, it is necessary to input energy such as of a heat supply from outside.

Patent Document 1: Japanese Patent No. 2586738
Patent Document 2: Japanese Patent No. 2600492
Patent Document 3: Japanese Patent No. 3642273
Patent Document 4: Japanese Unexamined Patent Application Publication No. 2002-89240

Non-patent Document 1: "Development of NOx Storage Reduction Three-way Catalyst System," Collective Papers of Society of Automotive Engineers of Japan, Vol. 26, No. 4, October 1995

Non-patent Document 2: "A NOx Reduction System Using Ammonia Storage-Selective Catalytic Reduction in Rich and Lean Operations," 15 Aachener Kolloquium Fahrzeug-und Motorentechnik 2006 p. 259-270

However, there is the following problem in a case of repeating lean operation and rich operation of an engine as in the technology shown in Patent Documents 1 and 2 and Non-patent Documents 1 and 2 described above, for example.

In other words, when the exhaust air/fuel ratio is made rich in order to reduce the NOx occluded to the LNT, there is a case in that, if NOx of a great amount is contained in the exhaust flowing into the LNT, the reducing agent is mostly consumed in the reduction of NOx in the exhaust. In such a case, the NOx occluded to the LNT desorbs from the exhaust air/fuel ratio being made rich; however, it will be discharged downstream of the LNT without being reduced, and thus the NOx purification performance may decline.

Incidentally, a method of lowering the NOx emitted by recirculating a portion of the exhaust to an intake side is known. However, although the emission amount of NOx can be reduced when recirculating a great amount of exhaust, the emission amount of particulates will increase. In particular, since it is difficult to recirculate a great amount of exhaust during high-load operation in which there is a tendency for the emission amount of NOx to increase, the amount of NOx discharging from the LNT may increase along with an increase in the emission amount of NOx.

In addition, when NOx occluded to the LNT is reduced, it is necessary to make the exhaust air/fuel ratio rich. As methods for making the exhaust air/fuel ratio rich, there is a method of enriching the exhaust air/fuel ratio by performing fuel injection that does not contribute to torque (hereinafter referred to as "post injection") and flowing uncombusted fuel to an exhaust channel (hereinafter referred to as "method by post rich"), and a method of enriching by adjusting a fuel injection (hereinafter referred to as "main injection") amount that contributes to torque (hereinafter referred to as "method by combustion rich").

However, since fuel is injected into the cylinders in the latter half of the combustion stroke or in the exhaust stroke of the engine in the method by post rich, a portion of the fuel adheres to the cylinder walls. In other words, in the method by post rich, not all of the fuel supplied by post injection contributes to enrichment of the exhaust air/fuel ratio. As a result, the fuel economy may deteriorate compared to the method by combustion rich. In addition, the fuel adhered to the cylinder walls will mix in its current state into the engine oil, and thus so-called oil dilution may occur.

Moreover, with the method of combustion rich, the operating conditions thereof are limited. For example, during high-load operation in which combustion becomes sharp, the combustion noise grows worse. In addition, during low-load operation such as immediately after startup of the engine or while idling, the charge efficiency to the cylinders may decline and combustion may become unstable.

Alternatively, when rich operation is performed and the exhaust air/fuel ratio is made rich, although NOx occluded to the LNT desorbs, in a case in which the NOx occlusion amount of the LNT is large, NOx will be discharged downstream of the LNT without being reduced, and thus the NOx purification performance may decline.

Consequently, it has been considered to increase the frequency of performing rich operation and reduce NOx frequently so that the NOx occlusion amount of the LNT does not become large. However, the region in which rich operation can be performed is limited depending on the operation state of the engine such as revolution speed and torque. As a result, it is difficult to reduce NOx frequently independently of the operating state of the engine.

In addition, the exhaust purification system of Patent Document 3 and 4 is different from that exemplified in Patent Document 1 and 2 described above, and specifically is a system that adds hydrogen, carbon monoxide and hydrocarbons into exhaust having an oxygen excess, irrespective of lean operation and rich operation.

However, in a case of purifying with LNT by adding a reducing agent such as hydrogen, carbon monoxide, and hydrocarbons into exhaust having an oxygen excess in such a way, the ability to purify NOx is limited to approximately 200° C. For example, when the temperature of the LNT is at least 200° C., the hydrogen and carbon monoxide thus added combust. As a result, with such a temperature, the amount of additive is deficient, leading to the reduction reaction of NOx not progressing sufficiently.

In addition, in a case of providing a fuel reformer in an exhaust channel having an exhaust amount that regularly fluctuates, as in the exhaust purification systems of Patent Documents 3 and 4, it is necessary to increase the reaction time for which the reforming catalyst of the fuel reformer and the exhaust come into contact, in order to effectively produce hydrogen in this fuel reformer. However, in order to increase the reaction time as such, it is necessary to increase the size of the reforming catalyst, which may raise cost.

In addition, in order to operate the fuel reformer in a stable state, it is necessary to maintain the reaction temperature of the reforming catalyst of this fuel reformer to be constant. However, when providing a fuel reformer in an exhaust channel for which the oxygen amount, steam amount, and temperature are always fluctuating depending on the operating state of the engine, as in the exhaust purification systems of Patent Documents 3 and 4 described above, it becomes difficult to operate the fuel reformer in a stable state. In a case in which such a fuel reformer cannot be operated stably, in a case in which NOx of a large amount is contained in the exhaust as described above, or a similar case, NOx may discharge to downstream of the LNT without being completely reduced.

Incidentally, sulfur components in the fuel and engine oil are contained in exhaust emitted from the internal combustion engine. When such sulfur components accumulate on the NOx purification catalyst, the NOx purification performance declines. Therefore, the following plurality of techniques has been proposed that aim to prevent the purification performance from declining due to such poisoning of the NOx purification catalyst.

The most general method is to execute a regeneration process of purifying sulfur components adhered to the NOx purification catalyst by making the exhaust air/fuel ratio lower than a stoichiometric ratio over a predetermined time period and making the NOx purification catalyst to be high temperature.

Herein, as a method of controlling the exhaust air/fuel ratio when performing the regeneration process, in addition to the method by combustion rich and the method by post rich described above, a method has also been known of directly injecting fuel into the exhaust channel (hereinafter referred to as "method by exhaust injection").

Alternatively, an exhaust purification device that provides a fuel reformer, which produces a reducing gas containing hydrogen, carbon monoxide, etc. by way of a reforming reaction, upstream of a NOx purification catalyst is proposed in Patent Document 5. According to this exhaust purification device, removal of sulfur components is promoted by adding hydrogen thus produced by the fuel reformer to the exhaust when executing the regeneration process of the NOx purification catalyst.

In addition, an exhaust purification device that purifies NOx in exhaust by producing hydrogen from hydrocarbons and steam by a plasma generator and adding this hydrogen to the NOx purification catalyst, as well as that prevents sulfur component from adhering to the NOx purification catalyst by suppressing oxidation of $SO_2$ is proposed in Patent Document 6.

Moreover, the matter of executing a regeneration process of a NOx purification catalyst efficiently and over a short time period by selectively supplying hydrogen and gasoline depending on the temperature of the NOx purification catalyst of an exhaust purification device of an engine that employs hydrogen as a fuel is proposed in Patent Document 7.

Patent Document 5: Japanese Patent No. 3896923
Patent Document 6: Japanese Unexamined Patent Application Publication No. 2004-270587
Patent Document 7: Japanese Unexamined Patent Application Publication No. 2006-307679

However, the following issues exist in the techniques as described above.

First, in the regeneration process of the NOx purification catalyst, when controlling the exhaust air/fuel ratio by the method of exhaust injection, uncombusted fuel makes direct contact with the NOx purification catalyst and other catalysts, the temperature of the catalyst surface becomes high locally under an oxidizing atmosphere, and thus the catalyst may deteriorate due to sintering or the like. In addition, when fuel contacts the catalyst in a droplet state, the temperature of the catalyst surface at the contacting portion thereof will decrease locally due to the latent heat of vaporization, and thus coking may occur. In particular, if exhaust injection is performed in a case in which the exhaust temperature is low, the exhaust temperature will decrease further due to the latent heat of vaporization of the fuel supplied by exhaust injection, whereby liquid fuel collects in the exhaust channel, the catalyst deteriorates, and exhaust system components may corrode.

In addition, in the regeneration process of the NOx purification catalyst, when controlling the exhaust air/fuel ratio by the method of post injection, a portion of the fuel injected adheres to the surface of the wall of the cylinders, and thus this fuel may mix into the engine oil. In such a case, not only does the fuel injected not contribute to the purification of the sulfur component, but also so-called oil dilution in which engine oil is diluted by this fuel may occur.

In addition, in the regeneration process of the NOx purification catalyst, in a case of controlling the exhaust air/fuel ratio by the method of combustion rich, for example, combustion may become unstable if a state in which the intake air amount must be drastically decreased such as during low-load operation is continued. As a result, in a case of transitioning to idle operation or deceleration operation, the exhaust air/fuel ratio at this time must be returned to lean.

Incidentally, the NOx purification catalyst has a function of adsorbing oxygen in exhaust when the exhaust air/fuel ratio is lean. As a result, reducing agents in the exhaust will react with oxygen adsorbed while lean immediately after the exhaust air/fuel ratio is switched from lean to rich, and thus it becomes difficult for sulfur component adhered to the NOx purification catalyst to desorb. Therefore, if the frequency at which the exhaust air/fuel ratio is returned to lean increases as described above, control for causing the sulfur to desorb becomes an extra necessity along with this, and the NOx purification catalyst may degrade and the fuel economy may deteriorate.

In a case of providing a fuel reformer in an exhaust channel as in the exhaust purification device of Patent Document 5, there are the following issues.

In other words, due to the heat capacity upstream of the NOx purification catalyst increasing by providing the fuel reformer in the exhaust channel, the time from when the engine is started up to the activation temperature of the NOx purification catalyst is reached becomes long. As a result, the NOx purification performance particularly immediately after engine startup may decrease. Consequently, although providing a heat riser in order to avoid this has also been considered, a cost may be associated therewith.

In addition, in a case of providing the fuel reformer in an exhaust channel having an exhaust amount that regularly fluctuates, it is necessary to increase the reaction time for which the reforming catalyst of the fuel reformer and the exhaust come into contact, in order to effectively produce hydrogen in this fuel reformer. However, in order to increase the reaction time as such, it is necessary to increase the size of the reforming catalyst, which may raise cost.

In addition, in order to operate the fuel reformer in a stable state, it is necessary to maintain the reaction temperature of the reforming catalyst of this fuel reformer to be constant. However, when providing a fuel reformer in an exhaust channel for which the oxygen amount, steam amount, flow-rate, and temperature are always fluctuating as described above, it becomes difficult to operate the fuel reformer in a stable state.

With the exhaust purification device of Patent Document 6, the fuel economy may deteriorate due to there being a necessity to constantly produce hydrogen by causing plasma to be generated.

In addition, with the exhaust purification device of Patent Document 7, there is a necessity to provide a plurality of fuel tanks in order to supply hydrogen and gasoline separately. As a result, the device may increase in size, the maintenance properties may decline, and control thereof may become complex.

DISCLOSURE OF THE INVENTION

Problems to be Solved by the Invention

As mentioned above, with the exhaust purification devices and methods exemplified in Patent Documents 1 to 4 and Non-patent Documents 1 and 2, the NOx purification performance thereof may decline depending on the operating state of the engine.

In addition, with the exhaust purification devices exemplified in Patent Documents 5 to 7, the SOx regeneration process of the NOx purification catalyst cannot be executed stably irrespective of the operating state, a result of which the NOx purification performance may decline depending on the operating state.

An object of the present invention is to provide an exhaust purification device of an internal combustion engine that can prevent the NOx purification performance from declining depending on the operating state. In addition, concomitant with this, providing an exhaust purification device of an internal combustion engine that can stably execute a SOx regeneration process of the NOx purification catalyst irrespective of the operating state is also made an object of the present invention.

Means for Solving the Problems

In order to achieve the above objects, the present invention provides an exhaust purification device of an internal combustion engine provided with a NOx purification catalyst (33) that is provided in an exhaust channel (4, 5) of the internal combustion engine (1) and that, with an air/fuel ratio of exhaust flowing in the exhaust channel as an exhaust air/fuel ratio, adsorbs or occludes NOx in exhaust when the exhaust air/fuel ratio is made lean, and reduces the NOx adsorbed or occluded when the exhaust air/fuel ratio is made rich. The exhaust purification device includes a catalytic converter (31) that is provided in the exhaust channel, and continuously reduces NOx in exhaust using a reducing gas; a fuel reformer that is provided separately from the exhaust channel, produces a reducing gas containing hydrogen and carbon monoxide by reforming fuel, and supplies the reducing gas from an inlet (14) provided in the exhaust channel upstream of the NOx purification catalyst and the catalytic converter into the exhaust channel; an operating state detection means (40) for detecting an operating state of the internal combustion engine; and an enrichment means (40) for enriching the exhaust air/fuel ratio. The enrichment means enriches the exhaust air/fuel ratio by supplying reducing gas from the fuel reformer into the exhaust channel, in a case of an operating state detected by the operating state detection means being a high-load operating state.

According to this configuration, in a case in which the operating state of the internal combustion engine is a high-load operating state when the exhaust air-fuel ratio is enriched, reducing gas produced by the fuel reformer is supplied into the exhaust channel. Even in a case of being in the high-load operating state as described above and it being difficult to make the engine air/fuel ratio rich, this allows the exhaust air/fuel ratio of exhaust flowing into the NOx purification catalyst to be made rich while the engine air/fuel ratio is made lean and combustion in the internal combustion engine is kept in an optimal state, and thus reduction of NOx is promoted in the NOx purification catalyst. Therefore, the NOx purification performance can be prevented from declining depending on the operating state of the internal combustion engine. In addition, herein, since the engine air/fuel ratio can be kept lean, it is possible to prevent oil dilution as described above from occurring and combustion in the internal combustion engine from becoming unstable.

Moreover, by providing the fuel reformer that produces reducing gas to be separate from the exhaust channel, it is always possible to produce reducing gas at optimum efficiency irrespective of the operating state of the internal combustion engine, oxygen concentration and steam concentration of the exhaust, etc., and this reducing gas can be supplied into the exhaust channel. In addition, it becomes possible to supply reducing gas in response to requirements such as the operating state of the internal combustion engine by providing the fuel reformer to be separate from the exhaust channel.

On the other hand, in a case of providing the fuel reformer inside the exhaust channel, it is necessary to enlarge the fuel reformer so as to be able to operate without influencing the components, temperature, and flow rate of the exhaust; however, according to this configuration, it is possible to perform operation stably without enlarging the device by providing the fuel reformer to be separate from the exhaust channel. In addition, by providing the fuel reformer to be separate from the exhaust channel, it becomes possible to activate the catalyst provided to the fuel reformer at an early stage by performing control of an independent system from the control of the internal combustion engine.

Furthermore, the reduction reaction rate in the NOx purification catalyst can be improved by supplying reducing gas containing hydrogen. This can prevent desorption without the NOx adsorbed or occluded to the NOx purification catalyst being reduced when the exhaust air/fuel ratio is made rich.

Preferably, the exhaust purification device further includes an exhaust recirculation ratio estimation means (40, 21, 25, 26) for estimating an exhaust recirculation ratio of the internal combustion engine. The enrichment means enriches the exhaust air/fuel ratio by supplying reducing gas from the fuel reformer to the exhaust channel, in a case of the exhaust recirculation ratio (REGR) estimated by the exhaust recirculation ratio estimation means being smaller than a predetermined judgment value (REGRTH).

According to this configuration, in a case in which the exhaust recirculation ratio thus estimated is smaller than a predetermined judgment value while enriching the exhaust air/fuel ratio, the exhaust air/fuel ratio is enriched by supplying reducing gas produced by the fuel reformer to the exhaust channel.

Incidentally, if the engine air/fuel ratio is made rich while recirculating exhaust to the intake side, hydrocarbons in the exhaust deposit on the intake channel, and thus this intake channel may be blocked. According to this configuration, the exhaust air/fuel ratio is enriched without blocking the intake channel as described above, and thus the NOx purification performance of the NOx purification catalyst can be improved by supplying reductive gas.

Preferably, the catalytic converter is provided further upstream in the exhaust channel than the NOx purification catalyst.

According to this configuration, the NOx concentration of the exhaust flowing into the NOx purification catalyst 33 while rich can be reduced by providing the catalytic converter upstream of the NOx purification catalyst. In other words, the amount of NOx flowing into the NOx purification catalyst while rich can be reduced. Therefore, when the exhaust air/fuel ratio is made rich, NOx adsorbed or occluded to the NOx purification catalyst can be prevented from desorbing without being completely reduced.

Preferably, the exhaust purification device further includes an exhaust air/fuel ratio detection means (23) for detecting or estimating an exhaust air/fuel ratio in the exhaust channel between the inlet and the catalytic converter. The enrichment means adjusts a supply amount (GRG) of reducing gas so that the exhaust air/fuel ratio (AF) detected or estimated by the exhaust air/fuel ratio detection means matches a predetermined target value (NAFTV, HAFTV), in a case of enriching the exhaust air/fuel ratio by supplying reducing gas from the fuel reformer.

According to this configuration, in a case of enriching the exhaust air/fuel ratio by supplying reducing gas, the supply amount of reducing gas is adjusted so that the exhaust air/fuel ratio matches the predetermined target value. This can cause exhaust of the optimum air/fuel ratio to always be flowed into the NOx purification catalyst.

Preferably, the predetermined target value differs in a case of enriching the exhaust air/fuel ratio by supplying reducing gas from the fuel reformer, and in a case of enriching the exhaust air/fuel ratio without supplying reducing gas from the fuel reformer.

According to this configuration, the exhaust air/fuel ratio is enriched based on different target values in a case of enriching the exhaust air/fuel ratio by supplying a reducing gas, and in a case of enriching the exhaust air/fuel ratio without supplying a reducing gas. This can cause exhaust of the optimum air/fuel ratio to always be flowed into the NOx purification catalyst.

Preferably, the catalytic converter contains ceria, platinum, and rhodium.

According to this configuration, the reducing capacity of NOx by the catalytic converter can be further improved and sintering of the precious metal active species can be further suppressed by containing ceria in the catalytic converter. In addition, the reaction in this catalytic converter can be stabilized even if the oxygen concentration in the exhaust fluctuates suddenly, by containing rhodium, which has oxygen storage ability, in the catalytic converter. Moreover, oxidation and adsorption or occlusion of NO as well as reduction of NOx can be performed by containing platinum in the catalytic converter.

Preferably, the fuel reformer produces reducing gas that is at a pressure higher than atmospheric pressure and in which carbon monoxide is a main component by way of a partial oxidation reaction of hydrocarbon fuel and air.

According to this configuration, this fuel reformer can be made a smaller size by producing the reducing gas by way of the partial oxidation reaction. In order words, this is because a device to supply extra energy from outside does not need to be provided since the partial oxidation reaction as described above is an exothermic reaction, and once the reaction starts, the reaction progresses spontaneously. In addition, there is also no need to also provide a converter and system for concentrating hydrogen of a shift reaction, etc. Moreover, the light-off time of the fuel reformer can be shortened by making the fuel reformer to be small in this way. Therefore, reducing gas can be quickly supplied into the exhaust channel as needed.

In addition, reducing gas thus produced can be supplied into the exhaust channel without adding an extra device by producing reducing gas of a pressure higher than atmospheric.

Furthermore, by introducing light hydrocarbons generated secondarily in this partial oxidation reaction to the catalytic converter along with carbon monoxide and hydrogen, it can also be used in the reduction of NOx.

In order to achieve the above objects, the present invention provides an exhaust purification device of an internal combustion engine provided with a NOx purification catalyst (33) that is provided in an exhaust channel (4, 5) of the internal combustion engine (1) and that, with an air/fuel ratio of exhaust flowing in the exhaust channel as an exhaust air/fuel ratio, adsorbs or occludes NOx in exhaust when the exhaust air/fuel ratio is made lean, and reduces the NOx adsorbed or occluded when the exhaust air/fuel ratio is made rich. The exhaust purification device includes a fuel reformer (50A) that is provided separately from the exhaust channel, produces a reducing gas containing hydrogen and carbon monoxide by reforming fuel, and supplies the reducing gas from an upstream side in the exhaust channel of the NOx purification catalyst into the exhaust channel; and an enrichment means (40A) for enriching the exhaust air/fuel ratio. The enrichment means includes a first enrichment control means (40A) for enriching the exhaust air/fuel ratio while supplying reducing gas from the fuel reformer into the exhaust channel, and a second enrichment control means (40A) for enriching the exhaust air/fuel ratio without supplying reducing gas from the fuel reformer into the exhaust channel, and selects whether to enrich the exhaust air/fuel ratio by way of the first enrichment control means or to enrich by way of the second enrichment control means based on a predetermined condition.

According to this configuration, whether to enrich the exhaust air/fuel ratio while supplying reducing gas containing hydrogen and carbon monoxide into the exhaust channel or to enrich the exhaust air/fuel ratio without supplying this reducing gas when enriching the exhaust air/fuel ratio is selected depending on predetermined conditions. For example, even in an operating state in which it is difficult for the reduction reaction to occur in the NOx purification catalyst, this promotes the reduction reaction of the NOx purification catalyst and can prevent NOx from discharging without being reduced by enriching the exhaust air/fuel ratio while supplying reducing gas containing hydrogen, which has a high reaction rate compared to hydrocarbons. Therefore, the NOx purification performance can be prevented from declining depending on the operating state of the internal combustion engine.

In addition, by supplying reducing gas into the exhaust channel, the exhaust air/fuel ratio of exhaust flowing into the NOx purification catalyst can be richened while making the engine air/fuel ratio lean and maintaining combustion of the internal combustion engine in an optimal state. Therefore, NOx purification performance can be improved irrespective of the operating state of the internal combustion engine. In addition, herein, since the engine air/fuel ratio can be kept lean, oil dilution such as in a case in which the exhaust air/fuel ratio fluctuates by supplying fuel because of post injection or the like does not occur, and combustion of the internal combustion engine does not become unstable.

Moreover, by providing the fuel reformer that produces reducing gas to be separate from the exhaust channel, it is always possible to produce reducing gas at optimum efficiency irrespective of the operating state of the internal combustion engine, oxygen concentration and steam concentration of the exhaust, etc., and this reducing gas can be supplied into the exhaust channel. In addition, it becomes possible to supply reducing gas in response to requirements such as the operating state of the internal combustion engine by providing the fuel reformer to be separate from the exhaust channel.

On the other hand, in a case of providing the fuel reformer inside the exhaust channel, it is necessary to enlarge the fuel reformer so as to be able to operate without influencing the components, temperature, and flow rate of the exhaust; however, according to this configuration, it is possible to perform operation stably without enlarging the device by providing the fuel reformer to be separate from the exhaust channel. In addition, by providing the fuel reformer to be separate from the exhaust channel, it becomes possible to activate the catalyst provided to the fuel reformer at an early stage by performing control of an independent system from the control of the internal combustion engine.

Furthermore, the reduction reaction rate in the NOx purification catalyst can be improved by supplying reducing gas containing hydrogen. This can prevent desorption without the NOx adsorbed or occluded to the NOx purification catalyst being reduced when the exhaust air/fuel ratio is made rich.

Preferably, the exhaust purification device further includes a purification rate estimation means (40A, 27, 28) for estimating a NOx purification rate (CE) of the NOx purification catalyst. The enrichment means enriches the exhaust air/fuel ratio by way of the first enrichment control means, in a case of the NOx purification rate (CE) estimated by the purification rate estimation means being smaller than a predetermined purification rate judgment value (CEATH).

According to this configuration, in a case in which the NOx purification rate of the NOx purification catalyst is estimated and this estimated NOx purification rate is smaller than a predetermined purification rate judgment value, the exhaust air/fuel ratio is enriched by supplying reducing gas. This makes it possible for the amount of NOx adsorbed or occluded to the NOx purification catalyst to increase, and thus the amount of NOx discharging without being reduced when enriching to be reduced.

Preferably, the exhaust purification device further includes an exhaust flow-rate estimation means (40A, 21) for estimating or detecting, with a flow-rate of exhaust flowing through the exhaust channel as an exhaust flow-rate, the exhaust flow-rate. The enrichment means enriches the exhaust air/fuel ratio by way of the first enrichment control means, in a case in which the exhaust flow-rate (GE) estimated or detected by the exhaust flow-rate estimation means is at least a predetermined flow-rate judgment value (GETH).

According to this configuration, in a case in which the exhaust flow-rate is estimated and this exhaust flow-rate is at least a predetermined flow-rate judgment value, the exhaust air/fuel ratio is enriched by supplying reducing gas. In other words, in a case in which the exhaust flow-rate is large, although it becomes easy for NOx adsorbed or occluded to the NOx purification catalyst to desorb, even in such a case, NOx can be prevented from discharging downstream without being reduced by promoting the reduction reaction in the NOx purification catalyst by supplying reducing gas.

Preferably, the exhaust purification device further includes a catalyst temperature estimation means (40A, 22) for estimating or detecting, with a temperature of the NOx purification catalyst as a catalyst temperature, the catalyst temperature (TLNC); and a flow-rate judgment value determination means (40A) for determining the predetermined flow-rate judgment value based on the catalyst temperature estimated or detected by the catalyst temperature estimation means.

According to this configuration, the temperature of the NOx purification catalyst is estimated, and the flow-rate judgment value described above is determined based on this temperature. Incidentally, it becomes difficult for the reduction reaction of the NOx purification catalyst to occur with the temperature of the NOx purification catalyst becoming low, and thus it becomes easy for NOx to discharge without being reduced. According to this configuration, the NOx purification performance can be improved more effectively by determining the flow-rate judgment value by taking into account the temperature of the NOx purification catalyst.

Preferably, the exhaust purification device further includes an exhaust flow-rate estimation means (40A, 21) for estimating or detecting, with a flow-rate of exhaust flowing through the exhaust channel as an exhaust flow-rate, the exhaust flow-rate; a catalyst temperature estimation means (40A, 22) for estimating or detecting, with a temperature of the NOx purification catalyst as a catalyst temperature, the catalyst temperature; and an exhaust air/fuel ratio target value determination means (40A) for determining a target value of the exhaust air/fuel ratio (HAFTV, NAFTV) when enriching the exhaust air/fuel ratio by way of the first enrichment control means and the second enrichment control means, based on the exhaust flow-rate (GE) estimated or detected by the exhaust flow-rate estimation means, or on the catalyst temperature (TLNC) estimated or detected by the catalyst temperature estimation means. The first enrichment control means and the second enrichment control means each enrich so that the exhaust air/fuel ratio matches a target value determined by the exhaust air/fuel ratio target value determination means.

According to this configuration, the target value of the exhaust air/fuel ratio is determined based on the exhaust flow-rate thus estimated or detected, or on the temperature of the NOx purification catalyst estimated or detected, and the exhaust air/fuel ratio is enriched so as to match this exhaust air/fuel ratio target value. In this way, NOx can be effectively prevented from discharging from this NOx purification catalyst without being reduced by adjusting the exhaust air/fuel ratio when enriching according to the exhaust flow-rate or temperature of the NOx purification catalyst.

Preferably, the first enrichment control means enriches so that the exhaust air/fuel ratio (AFA) matches a target value (HAFTV) determined by the exhaust air/fuel ratio target value determination means, by adjusting a supply amount (GRG) of reducing gas supplied from the fuel reformer.

According to this configuration, in a case of enriching the exhaust air/fuel ratio by supplying reducing gas, the supply amount of reducing gas is adjusted so that the exhaust air/fuel ratio matches the target value determined by the exhaust air/fuel ratio target value determination means. This can cause exhaust of the optimum air/fuel ratio to always be flowed into the NOx purification catalyst.

In order to achieve the above objects, the present invention provides an exhaust purification device of an internal combustion engine provided with a NOx purification catalyst (33) that is provided in an exhaust channel (4, 5) of the internal combustion engine (1) and that, with an air/fuel ratio of exhaust flowing in the exhaust channel as an exhaust air/fuel ratio, adsorbs or occludes NOx in exhaust when the exhaust air/fuel ratio is made lean, and reduces the NOx adsorbed or occluded when the exhaust air/fuel ratio is made rich. The exhaust purification device includes a fuel reformer (50B) that is provided separately from the exhaust channel, produces a reducing gas containing hydrogen and carbon monoxide by reforming fuel, and supplies the reducing gas from an inlet (14B) provided in the exhaust channel upstream of the NOx purification catalyst into the exhaust channel; and a regeneration means (40B) for executing a SOx regeneration process of the NOx purification catalyst by enriching the exhaust air/fuel ratio. The regeneration means includes: a torque judgment means (40B) for judging whether a demanded torque (TRQ) of the internal combustion engine is smaller than a predetermined torque judgment value (TRQTH); a first enrichment means (40B) for enriching the exhaust air/fuel ratio by supplying reducing gas produced by the fuel reformer into the exhaust channel, in a case of being judged by the torque judgment means that the demanded torque is less than the torque judgment value; and a second enrichment means (40B) for enriching the exhaust air/fuel ratio without supplying reducing gas produced by the fuel reformer into the exhaust channel, in a case of being judged by the torque judgment means that the demanded torque (TRQ) is at least the torque judgment value (TRQTH).

According to this configuration, in a case of determining that the demanded torque is smaller than a predetermined torque judgment value when executing the SOx regeneration process of the NOx purification catalyst, the exhaust air/fuel ratio is enriched by supplying reducing gas into the exhaust channel, and in a case of determining that the demanded torque is at least the torque judgment value, the exhaust air/fuel ratio is enriched without supplying reducing gas into the exhaust channel. This can maintain the exhaust air/fuel ratio at or below the stoichiometric ratio by enriching with reducing gas, even in a case in which the demanded torque is smaller than a predetermined torque judgment value. That is, in a case of controlling the exhaust air/fuel ratio by the method of combustion rich as described above, it is difficult to maintain the exhaust air/fuel ratio to at or below the stoichiometric ratio during low-load operation in particular. According to this configuration, the time consumed in the SOx regeneration process can be shortened and deterioration of the NOx purification catalyst and degradation to fuel economy can be reduced compared to a case of performing the SOx regeneration process by the method of combustion rich. Therefore, the SOx regeneration process of the NOx purification catalyst can be executed stably irrespective of the operating state.

In addition, by using such a reducing gas, the exhaust air/fuel ratio can be controlled without supplying uncombusted fuel such as in exhaust injection or post injection. This enables issues such as the occurrence of coking, degradation or corrosion of the catalyst or components of the exhaust channel, deterioration of fuel economy, and the occurrence of oil dilution as described above to be avoided.

In addition, the molecular diameter of carbon monoxide and hydrogen contained in the reducing gas is small compared to the molecular diameter of hydrocarbons supplied by exhaust injection and post injection. As a result, even in a case in which a DPF that collects particulates (hereinafter referred to as "PM") in exhaust is provided upstream of the NOx purification catalyst and, for example, a large amount of PM has deposited on this DPF, the SOx regeneration process can be executed by supplying reducing gas to the NOx purification catalyst downstream of the DPF.

In addition, reducing gas can be supplied without adding heat capacity upstream of the NOx purification catalyst by providing the fuel reformer to be separate from the exhaust channel. This allows the SOx regeneration process to be performed without reducing the NOx purification performance while at low temperatures such as immediately after engine startup. Therefore, the NOx purification performance by the NOx purification catalyst can be prevented from declining depending on the operation state of the internal combustion engine.

In addition, by providing the fuel reformer that produces reducing gas to be separate from the exhaust channel, the execution time of the SOx regeneration process can be decided independently from the state of the internal combustion engine. Therefore, the SOx regeneration process can be suitably executed as needed while always controlling the internal combustion engine to the optimum state. Moreover, by providing the fuel reformer to be separate from the exhaust channel, reducing gas can always be produced at optimum efficiency irrespective of the operating state of the internal combustion engine, the oxygen concentration or steam concentration of the exhaust, etc., and this reductive gas can be supplied into the exhaust channel.

On the other hand, in a case of providing the fuel reformer inside the exhaust channel, it is necessary to enlarge the fuel reformer so as to be able to operate without influencing the components, temperature, and flow rate of the exhaust; however, according to this configuration, it is possible to perform operation stably without enlarging the device by providing the fuel reformer to be separate from the exhaust channel. In addition, by providing the fuel reformer to be separate from the exhaust channel, it becomes possible to activate the catalyst provided to the fuel reformer at an early stage by performing control of an independent system from the control of the internal combustion engine.

Preferably, reducing gas produced by the fuel reformer is at a pressure higher than atmospheric pressure and contains more carbon monoxide than hydrogen by volume ratio.

According to this configuration, more carbon monoxide than hydrogen is contained in the reductive gas. Moreover, the temperature at which carbon monoxide begins to combust on the catalyst is a lower temperature than the temperature at which hydrogen begins to combust. In the SOx regeneration process, the NOx purification catalyst is quickly raised in temperature by supplying such a reducing gas containing carbon monoxide, and thus the purification of SOx can be promoted.

In addition, reducing gas thus produced can be supplied into the exhaust channel without adding an extra device by producing reducing gas of a pressure higher than atmospheric.

Preferably, oxygen is contained in exhaust flowing through the exhaust channel when reducing gas from the fuel reformer is introduced into the exhaust channel.

Preferably, the exhaust purification device further includes an oxygen concentration detection means (23B) for detecting an oxygen concentration of exhaust flowing through the exhaust channel between the inlet and the NOx purification catalyst.

According to this configuration, an oxygen concentration detection means is provided that detects the oxygen concentration flowing between the inlet and the NOx purification catalyst. This enables the oxygen concentration of the exhaust flowing into the NOx purification catalyst to be controlled to the predetermined target value with good accuracy. In addition, an excessive rise in temperature of the NOx purification catalyst can be prevented by controlling the oxygen concentration of the exhaust flowing into the NOx purification catalyst. Moreover, it becomes possible to make the start of the SOx regeneration process quick, i.e, quickly raise the temperature of the NOx purification catalyst up to a predetermined target temperature, by performing control to prevent such an excessive rise in temperature.

Preferably, the torque judgment value (TRQTH) is determined based on a revolution speed (NE) of the internal combustion engine.

According to this configuration, the torque judgment value is determined based on the revolution speed of the internal combustion engine. This enables the decision of whether to enrich by supplying reducing gas to the exhaust channel when executing the SOx regeneration process to be determined more appropriately according to the state of the internal combustion engine.

Preferably, the first enrichment means and the second enrichment means control the exhaust air/fuel ratio (AFB) so as to match a predetermined first exhaust air/fuel ratio target value (AFATV) and a second air/fuel ratio target value (AFBTV), respectively. Moreover, the first exhaust air/fuel ratio target value is larger than the second exhaust air/fuel ratio target value.

According to this configuration, in a case of enriching by the first enrichment means and the second enrichment means, the exhaust air/fuel ratio is controlled so as to match the first exhaust air/fuel ratio target value and the second exhaust air/fuel ratio target value, respectively. In addition, herein, the first exhaust air/fuel ratio target value is larger than the second exhaust air/fuel ratio target value. This enables the exhaust flowing into the NOx purification catalyst to be controlled to an exhaust air/fuel ratio that is appropriate for performing the SOx regeneration process in a case of supplying and in a case of not supplying reducing gas.

Preferably, the first enrichment means controls the exhaust air/fuel ratio (AFB) so as to match the first exhaust air/fuel ratio target value (AFATV), by adjusting a supply amount of reducing gas from the fuel reformer.

According to this configuration, in a case of enriching the exhaust air/fuel ratio by supplying reducing gas, the exhaust air/fuel ratio is controlled so as to match the first exhaust air/fuel ratio target value by adjusting the supply amount of reducing gas. This enables the exhaust flowing into the NOx purification catalyst to be controlled to an exhaust air/fuel ratio that is appropriate for performing the SOx regeneration process.

Preferably, the second enrichment means controls the exhaust air/fuel ratio (AFB) so as to match the second exhaust air/fuel ratio target value (AFBTV), by adjusting a fuel injection amount of the internal combustion engine.

According to this configuration, in a case of enriching the exhaust air/fuel ratio without supplying reducing gas, the exhaust air/fuel ratio is controlled so as to match the second exhaust air/fuel ratio target value by adjusting the fuel injection amount. This enables the exhaust flowing into the NOx purification catalyst to be controlled to an exhaust air/fuel ratio that is appropriate for performing the SOx regeneration process.

Preferably, the exhaust purification device further includes an intake control means for controlling an intake air amount, exhaust recirculation ratio, and boost pressure of the internal combustion engine when enriching the exhaust air/fuel ratio by way of the first enrichment means and the second enrichment means.

According to this configuration, the intake air amount, exhaust recirculation ratio, and boost pressure are controlled while executing the SOx regeneration process. This enables the exhaust flowing into the NOx purification catalyst to be controlled to an exhaust air/fuel ratio that is appropriate for performing the SOx regeneration process.

Preferably, the exhaust purification device further includes a deceleration judgment means (40B) for judging whether the internal combustion engine is in a state in which injection of fuel has been suspended in accordance with a deceleration state thereof. The first enrichment means enriches the exhaust air/fuel ratio by supplying reducing gas from the fuel reformer into the exhaust channel, in a case of being judged by the deceleration judgment means to be in a state in which the injection of fuel has been suspended. The intake control means performs at least one among control to minimize the intake air amount, and control to maximize the exhaust recirculation ratio, in a case of being judged by the deceleration judgment means to be in a state in which the injection of fuel has been suspended.

According to this configuration, in a case of the internal combustion engine performing so-called deceleration fuel-cut in a state in which the injection of fuel has been suspended with deceleration operation thereof, at least one among control to minimize the intake air amount and control to maximize the exhaust recirculation ratio is performed, and the exhaust air/fuel ratio is enriched by supplying reducing gas. This enables the exhaust air/fuel ratio of the exhaust flowing into the NOx purification catalyst to be maintained at or below the stoichiometric ratio while performing deceleration fuel-cut, and for the SOx regeneration process to be continued. Therefore, the time consumed in the SOx regeneration process can be further shortened and deterioration of the fuel economy can be reduced.

Figure 1:
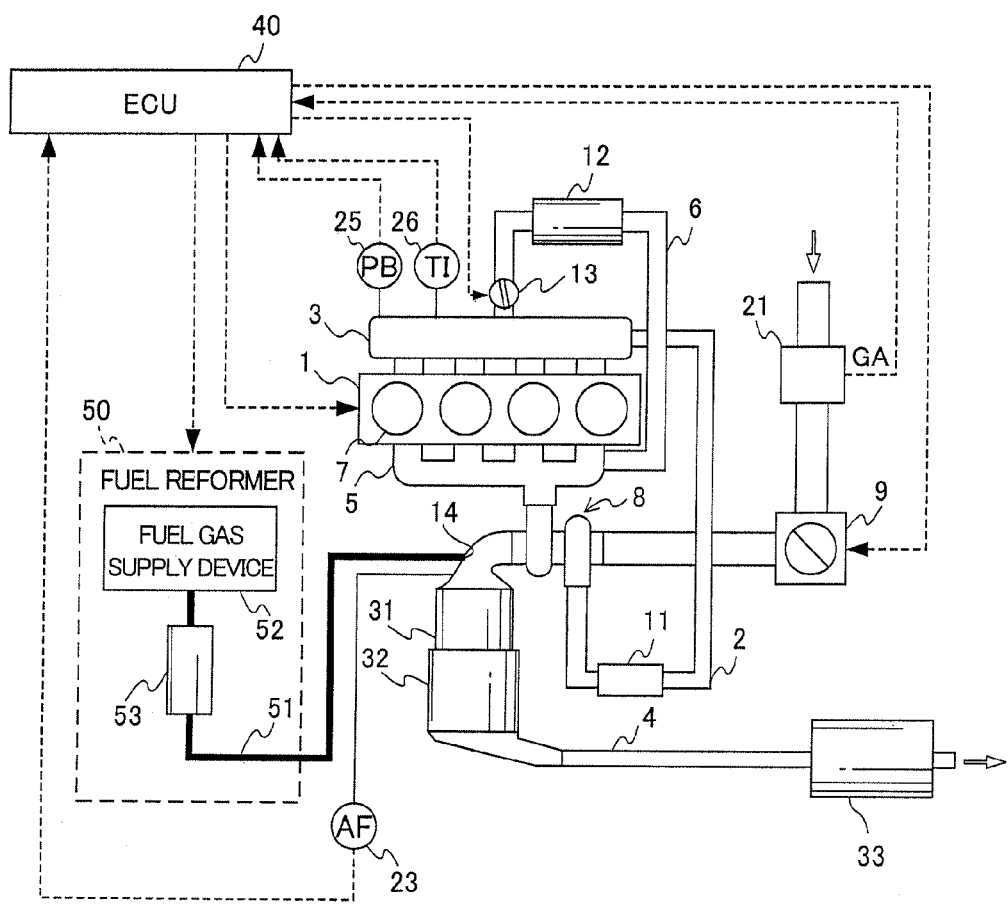
FIG. 1 is a view showing a configuration of an internal combustion engine and an exhaust purification device thereof according to a first embodiment of the present invention.

| EXPLANATION OF REFERENCE NUMERALS | |
|---|---|
| 1 | Engine (internal combustion engine) |
| 4 | Exhaust plumbing (exhaust channel) |
| 5 | Exhaust manifold (exhaust channel) |
| 14 | Inlet |
| 14A | Inlet |
| 14B | Inlet |
| 21 | Air-flow meter (exhaust flow-rate estimation means) |
| 22 | Exhaust temperature sensor (catalyst temperature estimation means) |
| 23 | UEGO sensor (exhaust air/fuel ratio detection means) |
| 23B | UEGO sensor (oxygen concentration detection means) |
| 25 | Boost pressure sensor (exhaust recirculation ratio estimation means) |
| 26 | Temperature sensor (exhaust recirculation ratio estimation means) |
| 27 | Upstream NOx sensor (purification rate estimation means) |
| 28 | Downstream NOx sensor (purification rate estimation means) |
| 31 | Catalytic converter |
| 33 | NOx purification catalyst |
| 40 | Electronic control unit (enrichment means, operating state detection means, exhaust recirculation ratio estimation means) |
| 40A | Electronic control unit (enrichment means, first enrichment control means, second enrichment control means, purification rate estimation means, exhaust flow-rate estimation means, catalyst temperature estimation means, flow-rate judgment value determination means, exhaust air/fuel ratio target value determination means) |
| 40B | Electronic control unit (regeneration means, torque judgment means, first enrichment means, second enrichment means, intake control means, deceleration judgment means) |
| 50 | Fuel reformer |
| 50A | Fuel reformer |
| 50B | Fuel reformer |

PREFERRED MODE FOR CARRYING OUT THE INVENTION

First Embodiment

A first embodiment of the present invention is explained below while referring to the drawings.

FIG. 1 is a view showing a configuration of an internal combustion engine and an exhaust purification device thereof according to the first embodiment of the present invention. An internal combustion engine (hereinafter referred to as "engine") 1 is a diesel engine that directly injects fuel into the combustion chamber of each cylinder 7, and fuel injectors, which are not illustrated, are provided to each of the cylinders 7. These fuel injectors are electrically connected by an electronic control unit (hereinafter referred to as "ECU") 40, and the valve-open duration and the valve-close duration of the fuel injectors are controlled by the ECU 40.

The engine 1 is provided with intake plumbing 2 in which intake air flows, exhaust plumbing 4 in which exhaust gas flows, an exhaust-gas recirculation path 6 that recirculates a portion of the exhaust in the exhaust plumbing 4 to the intake plumbing 2, and a turbocharger 8 that compresses and feeds intake air to the intake plumbing 2.

The intake plumbing 2 is connected to the intake port of each cylinder 7 of the engine 1 via a plurality of branches of an intake manifold 3. The exhaust plumbing 4 is connected to the exhaust port of each cylinder 7 of the engine 1 via a plurality of branches of an exhaust manifold 5. The exhaust-gas recirculation path 6 branches from the exhaust manifold 5 and leads to the intake manifold 3.

The turbocharger 8 includes a turbine, which is not illustrated, provided to the exhaust plumbing 4, and a compressor, which is not illustrated, provided to the intake plumbing 2. The turbine is driven by the kinetic energy of exhaust gas flowing in the exhaust plumbing 4. The compressor is rotationally driven by the turbine, and compresses and feeds intake air into the intake plumbing 2. In addition, the turbine is provided with a plurality of variable vanes, which are not illustrated, and is configured so that the turbine revolution number (revolution speed) can vary by way of causing the aperture of the variable vanes to change. The vane aperture of the turbine is electromagnetically controlled by the ECU 40.

A throttle valve 9 that controls the intake air amount GA of the engine 1 is provided inside the intake plumbing 2 at an upstream side of the turbocharger 8. This throttle valve 9 is connected to the ECU 40 via an actuator, and the aperture thereof is electromagnetically controlled by the ECU 40. In addition, an intercooler 11 for cooling the intake air compressed by the turbocharger 8 is provided in the intake plumbing 2 at a downstream side of the turbocharger 8.

The exhaust-gas recirculation path 6 connects the exhaust manifold 5 and the intake manifold 3, and recirculates a portion of the exhaust emitted from the engine 1. An EGR cooler 12, which cools exhaust gas that is recirculated, and an EGR valve 13 that controls the flow rate of exhaust gas being recirculated are provided in the exhaust-gas recirculation path 6. The EGR valve 13 is connected to the ECU 40 via an actuator, which is not illustrated, and the valve aperture thereof is electromagnetically controlled by the ECU 40.

A catalytic converter 31, particulate matter collection device (hereinafter referred to as "DPF" (Diesel Particulate Filter)) 32, and a NOx purification catalyst 33 that purifies exhaust are provided in this order from an upstream side downstream of the turbocharger 8 in the exhaust plumbing 4.

The catalytic converter 31 includes a three-way catalyst that continuously reduces NOx in the exhaust using reductive gas supplied from the fuel reformer 50 described later. This catalytic converter 31 contains platinum (Pt) and rhodium (Rh), which has an ability to reduce NOx in the exhaust, and ceria ($CeO_2$), which has oxygen storage ability.

In the present embodiment, a substance, which is prepared by producing a slurry by way of agitating and mixing 2.4 (g/L) of platinum (Pt), 1.2 (g/L) of rhodium, 6.0 (g/L) of palladium (Pd), 50 (g/L) of ceria, 150 (g/L) of alumina ($Al_2O_3$), and 10 (g/L) of binder along with an aqueous medium in a ball mill, then after coating this slurry on a support made of Fe—Cr—Al alloy, drying and calcining this at 600° C. over 2 hours, is used for the catalytic converter 31.

The DPF 32 collects, when exhaust flows through the fine pores in the filter walls, soot as particulates with elemental carbon as a main component in exhaust, by way of causing deposition thereof on the surface of the filter walls and in the pores inside the filter walls. For example, a ceramic such as silicon carbide (SiC) and a metallic madreporic body is used as a constituent material of the filter wall.

The NOx purification catalyst 33 includes platinum (Pt) that acts as a catalyst and is supported on a carrier of alumina ($Al_2O_3$), ceria ($CeO_2$), and a complex oxide of cerium and a rare earth (hereinafter referred to as "ceria-based complex oxide"), a ceria or a ceria-based complex oxide having NOx adsorption capacity, and a zeolite having a function of retaining ammonia ($NH_3$) generated on the catalyst as ammonium ion ($NH_4^+$).

In the present embodiment, a material formed by loading a NOx reduction catalyst composed of two layers onto a catalyst support is used as the NOx purification catalyst 33.

The lower layer of the NOx reduction catalyst is formed by producing a slurry by placing a material constituted with 4.5 (g/L) of platinum, 60 (g/L) of ceria, 30 (g/L) of alumina, 60 (g/L) of Ce—Pr—La-Ox, and 20 (g/L) of Zr-Ox into a ball mill with an aqueous medium, then agitating and mixing, followed by coating this slurry on the catalyst support.

In addition, the upper layer of the NOx reduction catalyst is formed by producing a slurry by placing a material constituted with 75 (g/L) of a beta zeolite ion-exchanged with iron (Fe) and cerium (Ce), 7 (g/L) of alumina, and 8 (g/L) of a binder into a ball mill with an aqueous medium, then agitating and mixing, followed by coating this slurry on the lower layer described above.

When the amount of adsorbed ammonia of the NOx purification catalyst 33 is small, since the NOx purification ability decreases, supply of a reducing agent (hereinafter referred to as "reduction") to the NOx purification catalyst 33 is performed in order to reduce the NOx appropriately. With this reduction, for example, the reducing agent is supplied to the NOx purification catalyst 33 by making the air/fuel ratio (engine air/fuel ratio) of the mixture inside the combustion chamber of the engine 1 to be richer than stoichiometric by way of increasing the fuel amount injected from the fuel injectors and decreasing the intake air amount GA with the throttle valve 9. In other words, by enriching the air/fuel ratio (exhaust air/fuel ratio) of exhaust emitted from the engine 1, the concentration of reducing agent in the exhaust flowing into the NOx purification catalyst 33 becomes higher than the concentration of oxygen, thereby carrying out reduction.

Purification of NOx in this NOx purification catalyst 33 will be explained.

First, the engine air/fuel ratio is set to be leaner than stoichiometric, and when so-called lean burn operation is performed, the concentration of reducing agent in the exhaust flowing into the NOx purification catalyst 33 becomes lower than the concentration of oxygen. As a result thereof, nitrogen monoxide (NO) and oxygen ($O_2$) in the exhaust react by action of the catalyst, and is adsorbed to ceria or a ceria-based complex oxide as $NO_2$. In addition, carbon monoxide (CO) that has not reacted with oxygen is also adsorbed to ceria or the ceria-based complex oxide.

Next, so-called rich operation is performed in which the engine air/fuel ratio is set to be richer than stoichiometric, and the exhaust air/fuel ratio is enriched. In other words, when reduction to make the concentration of the reducing agent in the exhaust higher than the concentration of oxygen is carried out, carbon dioxide ($CO_2$) and hydrogen ($H_2$) are generated by carbon monoxide in the exhaust reacting with water ($H_2O$), and carbon monoxide (CO) and carbon dioxide ($CO_2$) as well as hydrogen are generated by hydrocarbons (HC) in the exhaust reacting with water. Furthermore, NOx contained in the exhaust and NOx (NO, $NO_2$) adsorbed to ceria or the ceria-based complex oxide (and platinum) react with the hydrogen thus generated by action of the catalyst, thereby generating ammonia ($NH_3$) and water. In addition, the ammonia thus generated here is adsorbed to zeolite in the form of ammonium ions ($NH_4^+$).

Next, lean burn operation is performed in which the engine air/fuel ratio is set to be leaner than stoichiometric, and when the concentration of the reducing agent in the exhaust flowing into the NOx purification catalyst 33 is set to be lower than the concentration of oxygen, NOx is adsorbed to ceria or the ceria-based complex oxide. Furthermore, in a state where ammonium ions are adsorbed to the zeolite, NOx and oxygen in the exhaust react with ammonia, thereby generating nitrogen ($N_2$) and water.

In this way, according to the NOx purification catalyst 33, ammonia generated during reducing agent supply is adsorbed to the zeolite, and the ammonia adsorbed during lean burn operation reacts with NOx; therefore, it is possible to perform purification of NOx efficiently.

In addition, a fuel reformer 50, which reforms fuel gas to produce a reformed gas containing hydrogen ($H_2$), and carbon monoxide (CO) is connected upstream of the catalytic converter 31 inside the exhaust plumbing 4. This fuel reformer 50 supplies the reformed gas thus produced into the exhaust plumbing 4 from an inlet 14 formed upstream of the catalytic converter 31 inside the exhaust plumbing 4 as reductive gas.

The fuel reformer 50 is configured to include a gas path 51 that connects one end side to the exhaust plumbing 4, a fuel gas supply device 52 that supplies fuel gas from another end side of this gas path 51, and a reforming catalyst 53 as a reforming catalyst provided in the gas path 51.

The fuel gas supply device 52 produces fuel gas by mixing fuel stored in a fuel tank and air supplied by the compressor at a predetermined ratio, and supplies this fuel gas to the gas path 51. This fuel gas supply device 52 is connected to the ECU 40, and a supply amount of fuel gas and a mixture ratio thereof are controlled by the ECU 40. In addition, it is made possible to control the supply amount GRG (amount of reducing gas supplied into the exhaust plumbing 4 per unit time) of reductive gas supplied to the exhaust plumbing 4 by controlling the supply amount of this fuel gas.

The reforming catalyst 53 contains rhodium and ceria. This reforming catalyst 53 is a catalyst that reforms the fuel gas supplied from the fuel gas supply device 52, and produces a reformed gas containing hydrogen, carbon monoxide, and hydrocarbons. More specifically, this reforming catalyst 53 produces reformed gas that is higher pressure than atmospheric pressure and contains more carbon monoxide than hydrogen by volume ratio by way of the partial oxidation reaction of hydrocarbon fuel constituting the fuel gas and air. In addition, as described above, the partial oxidation reaction is an exothermal reaction. As a result, the fuel reformer 50 is able to supply into the exhaust plumbing 4 reducing gas of a temperature that is higher than the exhaust in the vicinity of the inlet 14 in the exhaust plumbing 4.

More specifically, for example, a substance, which is prepared by weighing fine powders of ceria and rhodium so as to make the mass ratio of rhodium to ceria be 1%, producing a slurry by placing this fine powder into a ball mill along with an aqueous medium and agitating and mixing, then after coating this slurry on a support made of Fe—Cr—Al alloy, drying and calcining this at 600° C. over 2 hours, is used as this reforming catalyst 53.

In addition, a heater (not illustrated) configured to include a glow plug, spark plug, or the like is connected to the reforming catalyst 53, whereby it is possible to heat the reforming catalyst 53 with startup of the fuel reformer 50. Moreover, the fuel reformer 50 is provided separately from the exhaust plumbing 4. In other words, the fuel gas supply device 52 and reforming catalyst 53 of the fuel reformer 50 are not provided in the exhaust plumbing 4.

A crank angle position sensor (not illustrated) that detects the rotational angle of the crankshaft of the engine 1, an accelerator sensor (not illustrated) that detects a depression amount AP of the accelerator pedal of a vehicle being driven by the engine 1, an air-flow meter 21 that detects an intake air amount GA (air amount newly aspirated into the engine 1 per unit time) of the engine 1, a UEGO sensor 23 that detects an oxygen concentration of the exhaust between the inlet 14 and the catalytic converter 31 in the exhaust plumbing 4, i.e. exhaust air/fuel ratio AF, a boost pressure sensor 25 that detects the pressure inside the intake manifold 3, i.e. boost pressure PB, and a temperature sensor 26 that detects a temperature TI of the intake manifold 3 are connected to the ECU 40, and detection signals of these sensors are supplied to the ECU 40.

Here, a revolution speed NE of the engine 1 is calculated by the ECU 40 based on the output of the crank angle position sensor. In addition, a demanded torque TRQ of the engine 1 is calculated by the ECU 40 based on the depression amount AP of the accelerator pedal, which is not illustrated.

The ECU 40 includes an input circuit that has functions such as of shaping input signal wave forms from every kind of sensor, correcting the voltage levels to predetermined levels, and converting analog signal values to digital signal values, and a central processing unit (hereinafter referred to as "CPU"). In addition to this, the ECU 40 includes a storage circuit that stores every kind of calculation program executed by the CPU and calculation results, and an output circuit that outputs control signals to the fuel reformer 50, throttle valve 9, EGR valve 13, turbocharger 8, fuel injectors of the engine 1, and the like.

The engine 1 is normally operated by setting the engine air/fuel ratio to be leaner than the stoichiometric ratio, and enrichment control to set the engine air/fuel ratio to be richer than the stoichiometric ratio is performed periodically by the ECU 40.

Figure 2:
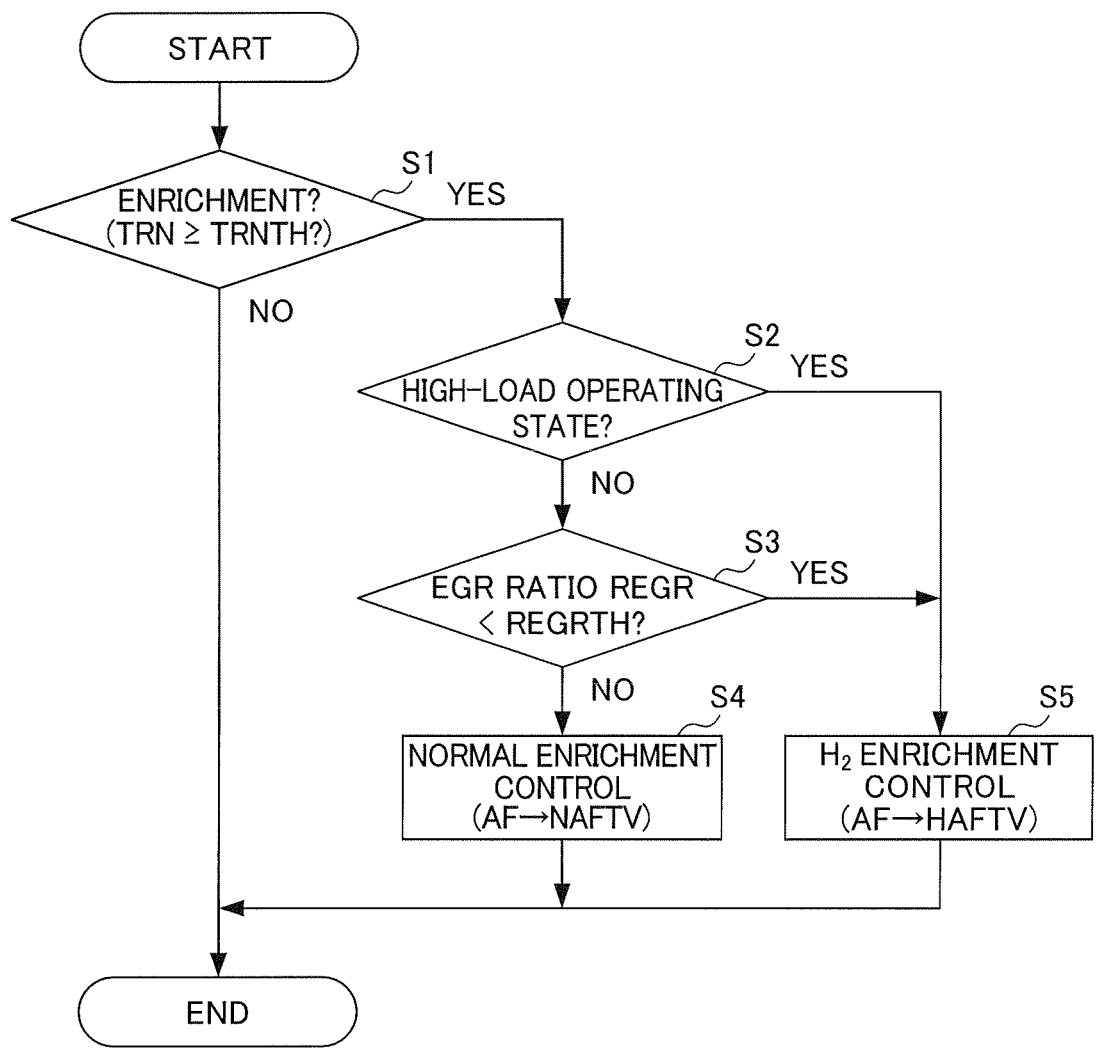
FIG. 2 is a flowchart showing a sequence of enrichment control by an ECU according to the embodiment.

FIG. 2 is a flowchart showing a sequence of enrichment control by the ECU. As shown in FIG. 2, normal enrichment control and $H_2$ enrichment control become selectively executable according to predetermined conditions.

In Step S1, it is determined whether to execute enrichment, and in the case of this determination being YES, Step S2 is advanced to, and in the case of being NO, enrichment control is ended. More specifically, the adsorption amount TRN of NOx adsorbed to the NOx purification catalyst is estimated based on the intake air amount GA, the fuel injection amount of the engine, etc., and in a case of this NOx adsorption amount TRN being at least a predetermined judgment amount TRNTH, enrichment control is executed.

In Step S2, it is determined whether it is a high-load operating state based on the fuel injection amount and revolution speed NE of the engine. In a case of this determination being YES, Step S5 is advanced to, and in a case of being NO, Step S3 is advanced to.

Figure 3:
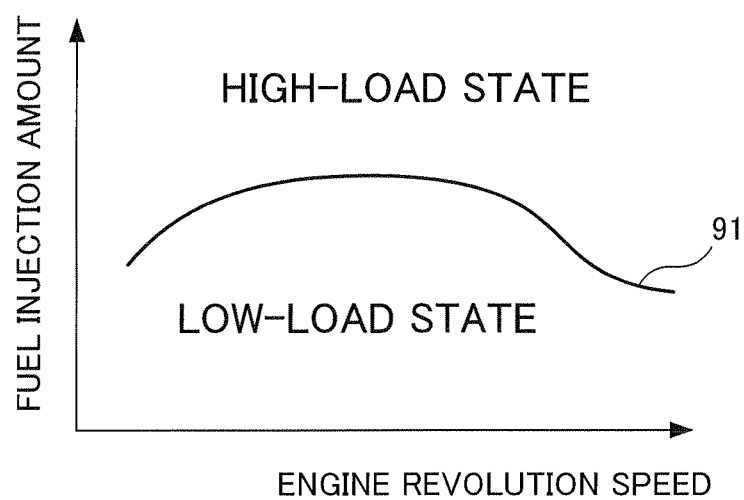
FIG. 3 is a graph showing operating states of an engine according to the embodiment.

FIG. 3 is a graph showing operating states of the engine. In FIG. 3, the horizontal axis is the revolution speed of the engine, and the vertical axis is the fuel injection amount of the engine. As shown in FIG. 3, revolution speed and fuel injection amount are set as parameters, and the operating state of the engine is divided into a high-load operating state and a low-load operating state by a curve 91. In Step S2 described above, the operating state of the engine is determined based on such a control map with fuel injection amount and revolution speed set as parameters.

In Step S3, an exhaust recirculation ratio REGR (hereinafter referred to as "EGR ratio REGR") is estimated, and it is determined whether this EGR ratio REGR is smaller than a predetermined judgment value REGRTH. In a case of this determination being YES, Step S5 is advanced to, and in a case of being NO, Step S4 is advanced to. Herein, the EGR ratio is estimated based on the intake air amount GA detected by the air-flow meter, the boost pressure PB detected by the boost pressure sensor, the temperature TI of the intake manifold detected by the temperature sensor 26, and the revolution speed NE of the engine.

In Step S4, normal enrichment control is executed, and after completion, enrichment control is ended. More specifically, in this normal enrichment control, the exhaust air/fuel ratio AF is controlled so as to match a predetermined first target value NAFTV by setting the engine air/fuel ratio to be richer than the stoichiometric ratio.

In Step S5, $H_2$ enrichment control is executed, and after completion, enrichment control is ended. More specifically, with this $H_2$ enrichment control, the exhaust air/fuel ratio AF is controlled so as to match a predetermined target value HAFTV by supplying reductive gas produced by the fuel reformer to the exhaust plumbing and adjusting a supply amount GRG of this reductive gas.

As explained in detail above, according to the present invention, in a case in which the operating state of the engine 1 is the high-load operating state when the exhaust air/fuel ratio is enriched, reducing gas produced by the fuel reformer 50 is supplied into the exhaust plumbing 4. Even in a case of being in the high-load operating state as described above and it being difficult to make the engine air/fuel ratio rich, this enables the exhaust air fuel ratio of exhaust flowing into the NOx purification catalyst 33 to be made rich while the engine air/fuel ratio is made lean and combustion in the internal combustion engine is kept in an optimal state, and thus reduction of NOx is promoted in the NOx purification catalyst 33. Therefore, the NOx purification performance can be prevented from declining depending on the operating state of the engine 1. In addition, herein, since the engine air/fuel ratio can be kept lean, it is possible to prevent oil dilution as described above from occurring and combustion in the engine 1 from becoming unstable.

Moreover, by providing the fuel reformer 50 that produces reducing gas to be separate from the exhaust plumbing 4, it is always possible to produce reducing gas at optimum efficiency irrespective of the operating state of the engine 1, oxygen concentration and steam concentration of the exhaust, etc., and this reducing gas can be supplied into the exhaust plumbing 4. In addition, it becomes possible to supply reducing gas in response to requirements such as the operating state of the engine 1 by providing the fuel reformer 50 to be separate from the exhaust plumbing 4.

On the other hand, in a case of providing the fuel reformer 50 inside the exhaust plumbing 4, it is necessary to enlarge the fuel reformer 50 so as to be able to operate without influencing the components, temperature, and flow rate of the exhaust; however, according to the present invention, it is possible to perform operation stably without enlarging the device by providing the fuel reformer 50 to be separate from the exhaust plumbing 4. In addition, by providing the fuel reformer 50 to be separate from the exhaust plumbing 4, it becomes possible to activate the reforming catalyst 53 provided to the fuel reformer 50 at an early stage by performing control of an independent system from the control of the engine 1.

Furthermore, the reduction reaction rate in the NOx purification catalyst 33 can be improved by supplying reducing gas containing hydrogen. This can prevent desorption without the NOx adsorbed or occluded to the NOx purification catalyst 33 being reduced when the exhaust air/fuel ratio is made rich.

In addition, according to the present embodiment, in a case in which the EGR ratio REGR thus estimated is smaller than a predetermined judgment value REGRTH while enriching the exhaust air/fuel ratio, the exhaust air/fuel ratio is enriched by supplying reducing gas produced by the fuel reformer 50 to the exhaust plumbing 4.

Incidentally, if the engine air/fuel ratio is made rich while recirculating exhaust to the intake side, hydrocarbons in the exhaust deposit on the intake plumbing 2, and thus this intake plumbing 2 may be blocked. According to the present embodiment, the exhaust air/fuel ratio is enriched without blocking the intake plumbing 2 as described above, and thus the NOx purification performance of the NOx purification catalyst 33 can be improved by supplying reductive gas.

In addition, according to the present embodiment, the NOx concentration of the exhaust flowing into the NOx purification catalyst 33 while rich can be reduced by providing the catalytic converter 31 upstream of the NOx purification catalyst 33. In other words, the amount of NOx flowing into the NOx purification catalyst 33 while rich can be reduced. Therefore, when the exhaust air/fuel ratio is made rich, NOx adsorbed or occluded to the NOx purification catalyst 33 can be prevented from desorbing without being completely reduced.

Moreover, according to the present embodiment, in a case of enriching the exhaust air/fuel ratio by supplying reducing gas, the supply amount GRG of reducing gas is adjusted so that the exhaust air/fuel ratio AF matches the predetermined target value NAFTV, HAFTV. This enables exhaust of an optimum exhaust air/fuel ratio to always be flowed into the NOx purification catalyst 33.

In addition, according to the present embodiment, the exhaust air/fuel ratio is enriched based on different target values in a case of enriching the exhaust air/fuel ratio by supplying a reducing gas, and in a case of enriching the exhaust air/fuel ratio without supplying a reducing gas. This enables exhaust of an optimum exhaust air/fuel ratio to always be flowed into the NOx purification catalyst 33.

Furthermore, according to the present embodiment, the reducing capacity of NOx by the catalytic converter 31 can be further improved and sintering of the precious metal active species can be further suppressed by containing ceria in the catalytic converter 31. In addition, the reaction in this catalytic converter 31 can be stabilized even if the oxygen concentration in the exhaust fluctuates suddenly, by containing rhodium, which has oxygen storage ability, in the catalytic converter 31. Moreover, oxidation and adsorption or occlusion of NO as well as reduction of NOx can be performed by containing platinum in the catalytic converter.

Furthermore, according to the present embodiment, this fuel reformer 50 can be made a smaller size by producing the reducing gas by way of the partial oxidation reaction. In order words, this is because a device to supply extra energy from outside does not need to be provided since the partial oxidation reaction as described above is an exothermic reaction, and once the reaction starts, the reaction progresses spontaneously. In addition, there is also no need to also provide a converter and system for concentrating hydrogen of a shift reaction, etc. Moreover, the light-off time of the fuel reformer 50 can be shortened by making the fuel reformer 50 to be small in this way. Therefore, reducing gas can be quickly supplied into the exhaust plumbing 4 as needed.

In addition, the reducing gas thus produced can be supplied into the exhaust plumbing 4 without adding an extra device by producing reducing gas of a pressure higher than atmospheric.

Furthermore, by introducing light hydrocarbons generated secondarily in this partial oxidation reaction to the catalytic converter 31 along with carbon monoxide and hydrogen, it can also be used in the reduction of NOx.

In the present embodiment, the ECU 40 configures the enrichment means, a portion of the operating state detection means, and a portion of the exhaust recirculation rate estimation means. More specifically, the means related to Steps S1 to S5 of FIG. 2 correspond to the enrichment means, the means related to Step S2 correspond to the operating state detection means, and the means related to Step S3, the airflow meter 21, the boost pressure sensor 25, and the temperature sensor 26 correspond to the exhaust recirculation ratio estimation means.

Next, NOx purification evaluation tests to verify the effects due to supplying reductive gas to the exhaust plumbing as in the above-mentioned embodiment will be explained with reference to FIGS. 4 and 5.

NOx Purification Performance Evaluation Test Method

Figure 4:
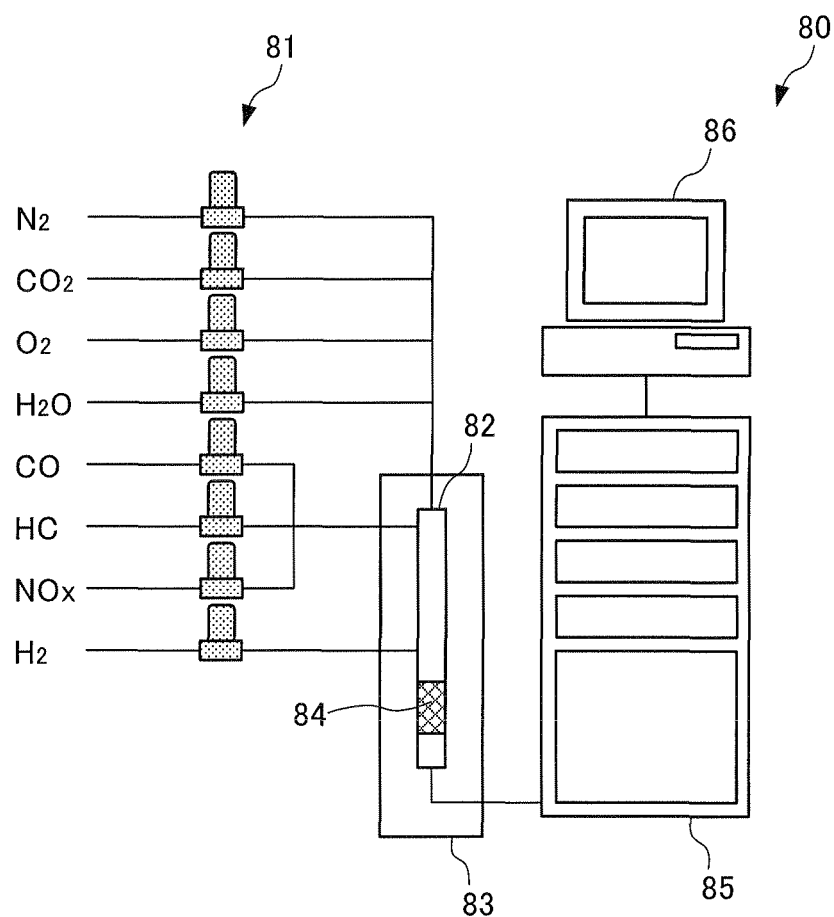
FIG. 4 is a schematic diagram showing a configuration of a test apparatus for NOx purification performance evaluation testing.

FIG. 4 is a schematic diagram showing a configuration of a test apparatus 80 for NOx purification performance evaluation tests.

The test apparatus 80 is configured to include a supply device 81 that supplies model gas at a predetermined composition, a heater 83 that is provided with adsorbent 84 inside thereof, a gas analyzer 85 that analyzes the model gas, and a computer 86 for data acquisition.

The supply device 81 supplies model gas constituted by $N_2$, $CO_2$, $O_2$, $H_2O$, CO, HC, NOx, and $H_2$ to the heater 83. This supply device 81 makes it possible to adjust the flow rate of each component of the model gas.

The heater 83 is provided with a reactor 82 and adsorbent 84 inside thereof, and heats this reactor 82 and adsorbent 84. The reactor 82 mixes and supplies to the adsorbent 84 the model gas supplied from the supply device 81.

The adsorbent 84 uses a material constituted by a three-way catalyst and a NOx purification catalyst. Herein, since the same materials as the catalytic converter 31 and NOx purification catalyst 33 (refer to FIG. 1 described above) described in the above embodiment are used in this three-way catalyst and NOx purification catalyst, explanations thereof are omitted.

The gas analyzer 85 measures the NOx concentration of the model gas inside the heater 83 supplied from the reactor 82 to the adsorbent 84, and having passed through this adsorbent 84. The computer 86 for data acquisition processes data related to this NOx concentration, and calculates the NOx purification ratio for each temperature. The NOx purification ratio is calculated based on the following formula.

NOx purification rate (%)=(Cin−Cout)/Cin×100

Here, Cin is the NOx concentration of model gas at the inlet of the adsorbent 84, and Cout is the NOx concentration of model gas at the outlet of the adsorbent 84. In addition, the NOx concentration of the model gas was measured according to a chemiluminescence method.

In the present evaluation tests, the NOx purification rate of model gas having passed the adsorbent 84 was measured in the test apparatus 80 configured as above while supplying model gas, with this model gas being heated from 50° C. up to 450° C.

In addition, the model gas was alternately supplied for the model gas of a composition of a lean atmosphere and a model gas of a composition of a rich atmosphere over 55 seconds and 5 seconds, respectively.

Example

In the model gas of the Example, model gas having the below composition was used as gas simulating the gas to which the reductive gas (containing carbon monoxide, hydrogen, and hydrocarbons) produced by the fuel reformer according to the above-mentioned embodiment to the exhaust has been added.

| Lean Atmosphere | |
|---|---|
| NO: | 90 ppm |
| CO: | 6000 ppm |
| HC (propylene): | 500 ppmC ($C_3H_6$) |
| $O_2$: | 6% |
| $CO_2$: | 6% |
| $H_2O$: | 7% |
| $N_2$: | balance gas |
| $H_2$: | 5000 ppm |
| SV = 50000 $h^{-1}$ | |
| Rich Atmosphere | |
| NO: | 90 ppm |
| CO: | 2.1% |
| HC (propylene): | 500 ppmC ($C_3H_6$) |
| $O_2$: | 0% |
| $CO_2$: | 6% |
| $H_2O$: | 7% |
| $N_2$: | balance gas |
| $H_2$: | 6000 ppm |
| SV = 50000 $h^{-1}$ | |

Comparative Example

In the model gas of the Comparative Example, model gas having the below composition was used as gas simulating the exhaust to which the above reductive gas has not been added.

| Lean Atmosphere | |
|---|---|
| NO: | 90 ppm |
| CO: | 1000 ppm |
| HC (propylene): | 500 ppmC ($C_3H_6$) |
| $O_2$: | 6% |
| $CO_2$: | 6% |
| $H_2O$: | 7% |
| $N_2$: | balance gas |
| $H_2$: | 0 ppm |
| SV = 50000 $h^{-1}$ | |
| Rich Atmosphere | |
| NO: | 90 ppm |
| CO: | 2% |
| HC (propylene): | 500 ppmC ($C_3H_6$) |
| $O_2$: | 0% |
| $CO_2$: | 6% |
| $H_2O$: | 7% |
| $N_2$: | balance gas |
| $H_2$: | 0 ppm |
| SV = 50000 $h^{-1}$ | |

Test Results

Figure 5:
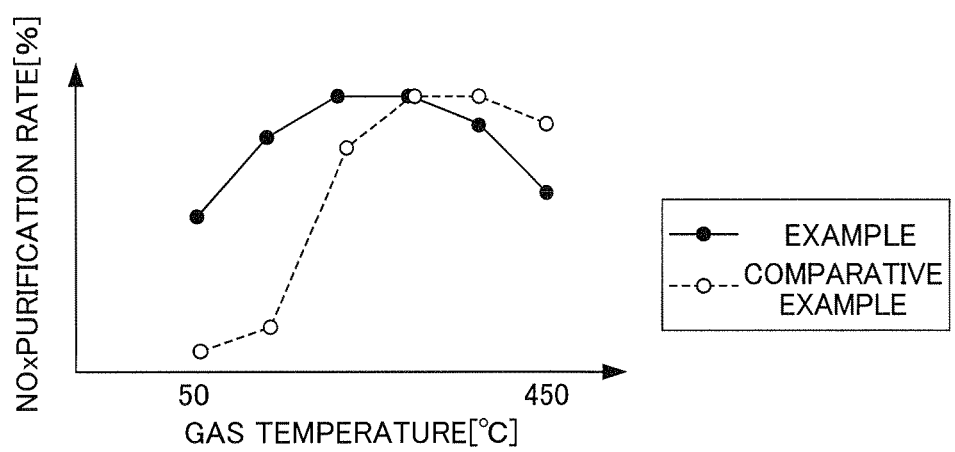
FIG. 5 is a graph showing test results of the Example and Comparative Example.

FIG. 5 is a graph showing test results of the Example and Comparative Example. In FIG. 5, the horizontal axis shows the temperature of the model gas, and the vertical axis shows the NOx purification ratio. In addition, the black dots show a relationship between the gas temperature and NOx purification rate in the Example, and the white dots show a relationship between the gas temperature and the NOx purification rate in the Comparative Example.

When comparing the NOx purification rates of the Example and the NOx purification ratio of the Comparative Example, the NOx purification rate of the Example is substantially constant over the entire temperature range, whereas the Comparative Example has a NOx purification rate in a low temperature range that becomes particularly small. Therefore, it has been verified that the NOx purification performance in a low temperature range in particular can be improved by adding reductive gas containing carbon monoxide and hydrogen as in the Example.

Second Embodiment

A second embodiment of the present invention is explained below while referring to the drawings. In the explanation of the second embodiment below, constitutional requirements identical to the first embodiment are assigned the same reference symbol, and explanations thereof are omitted or simplified.

Figure 6:
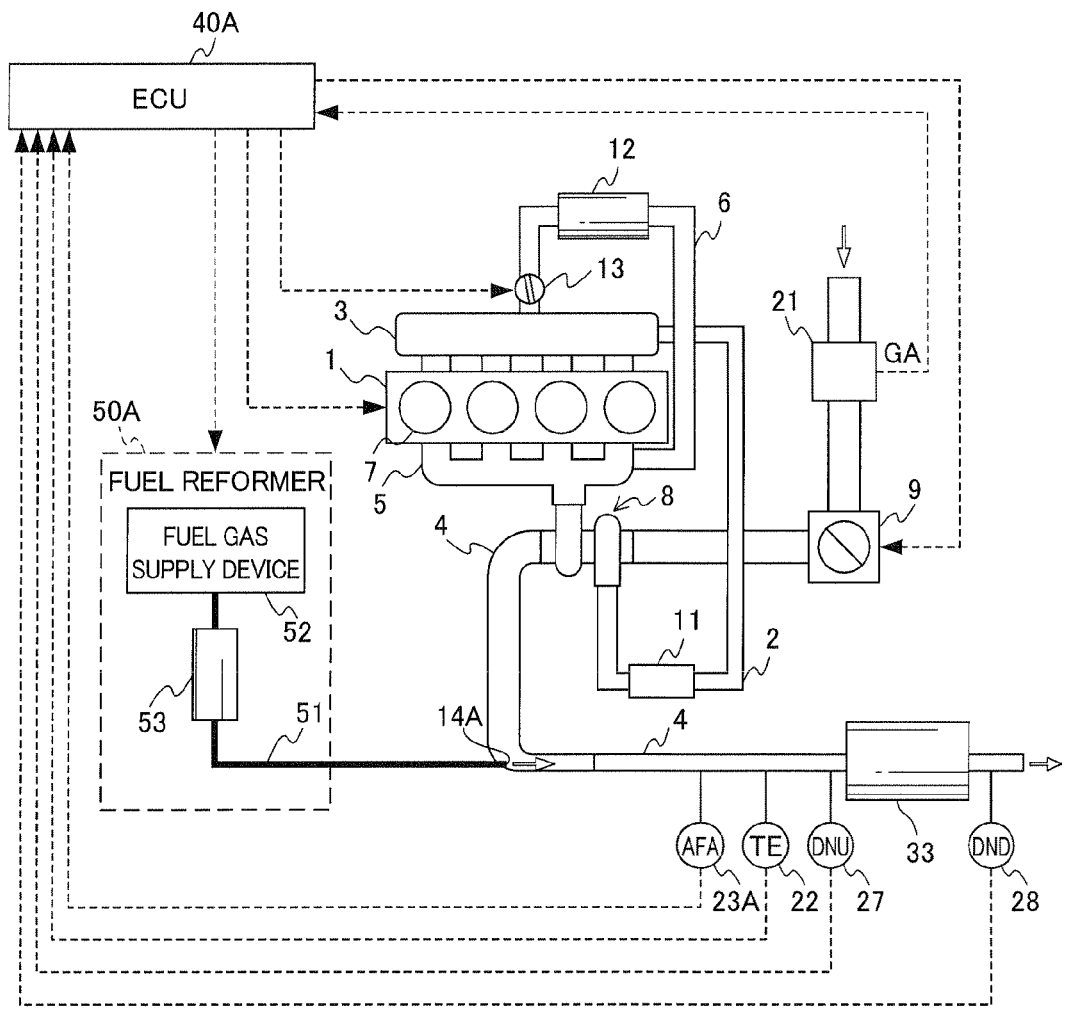
FIG. 6 is a view showing a configuration of an internal combustion engine and an exhaust purification device thereof according to a second embodiment of the present invention.

FIG. 6 is a view showing a configuration of the engine 1 and the exhaust purification device thereof according to the second embodiment of the present invention. The second embodiment is mainly different from the first embodiment in the configuration of a fuel reformer 50A and the configuration of an ECU 40A.

In the present embodiment, the fuel reformer 50A is connected into the exhaust plumbing 4 upstream of the NOx purification catalyst 33. In other words, reductive gas produced by the fuel reformer 50A is supplied from an inlet 14A formed in the exhaust plumbing 4 upstream of the NOx purification catalyst 33 into the exhaust plumbing 4.

An exhaust temperature sensor 22 that detects a temperature TE of exhaust flowing into the NOx purification catalyst 33, a UEGO sensor 23A that detects an oxygen concentration of exhaust flowing into the NOx purification catalyst 33, i.e. exhaust air/fuel ratio AFA, and an upstream NOx sensor 27 and a downstream NOx sensor 28 that detect NOx concentrations DNU and DND of exhaust in the exhaust plumbing 4 upstream and downstream of the NOx purification catalyst 33 are connected to the ECU 40A, and the detection signals of these sensors are supplied to the ECU 40A.

Figure 7:
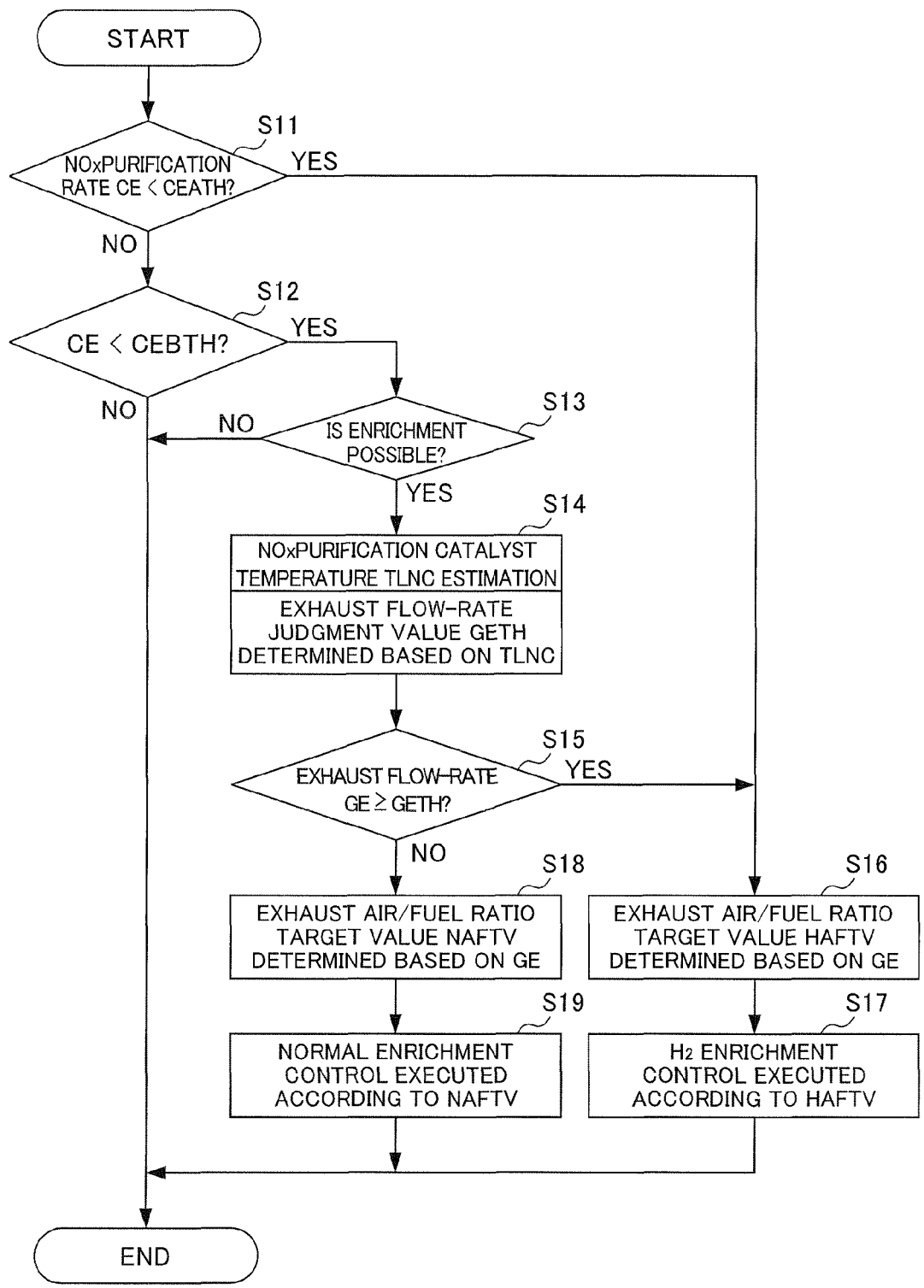
FIG. 7 is a flowchart showing a sequence of enrichment control by an ECU according to the embodiment.

FIG. 7 is a flowchart showing a sequence of enrichment control by the ECU. As shown in FIG. 7, in enrichment control of the present embodiment, $H_2$ enrichment control that enriches the exhaust air/fuel ratio by supplying reductive gas produced by the fuel reformer to the exhaust plumbing, and normal enrichment control that enriches the exhaust air/fuel ratio by enriching the engine air/fuel ratio without supplying reductive gas become selectively executable according to predetermined conditions.

In Step S11, a purification rate CE of NOx in the NOx purification catalyst is estimated, and it is determined whether this NOx purification rate CE is smaller than a predetermined first purification rate judgment value CEATH. In a case of this determination being YES, Step S16 is advanced to, and in a case of being NO, Step S12 is advanced to. Herein, the NOx purification rate CE is calculated based on the NOx concentrations DNU and DND of exhaust upstream and downstream of the NOx purification catalyst detected by the upstream NOx sensor and the downstream NOx sensor.

In Step S12, it is determined whether the NOx purification rate CE is smaller than a predetermined second purification rate judgment value CEBTH. In a case of this determination being YES, Step S13 is advanced to, and in a case of being NO, it ends. Herein, the second purification rate judgment value CEBTH is set to be a value larger than the first purification rate judgment value CEATH.

In Step S13, it is determined whether enrichment of the exhaust air/fuel ratio is possible based on the operating state of the engine. In a case of this determination being YES, Step S14 is advanced to, and in a case of being NO, enrichment control is ended.

Figure 8:
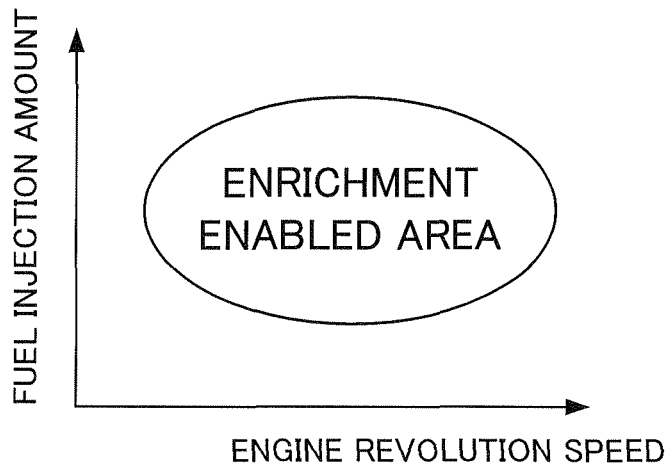
FIG. 8 is a graph showing operating states of the engine in which enrichment is possible according to the embodiment.

FIG. 8 is a graph showing operating states of the engine in which enrichment is possible. The operating states of the engine are shown according to the revolution speed of the horizontal axis and the fuel injection amount of the vertical axis. As shown in FIG. 8, the operating states in which enrichment is possible are limited. In Step S13, it is determined whether the operating state of the engine is a state in which enrichment is possible according to such a control map.

Referring again to FIG. 7, in Step S14, a temperature TLNC of the NOx purification catalyst is estimated based on the exhaust temperature TE detected by the exhaust temperature sensor, and the flow-rate judgment value GETH is further determined based on this exhaust temperature TLNC, and Step S15 is advanced to.

In Step S15, the flow-rate GE of exhaust flowing through the exhaust plumbing is estimated based on the intake air amount GA detected by the air/flow meter, and it is determined whether this exhaust flow-rate GE is at least the flow-rate judgment value GETH. In a case of this determination being YES, Step S16 is advanced to and $H_2$ enrichment control is executed, and in a case of being NO, Step S18 is advanced to and normal enrichment control is executed.

Figure 9:
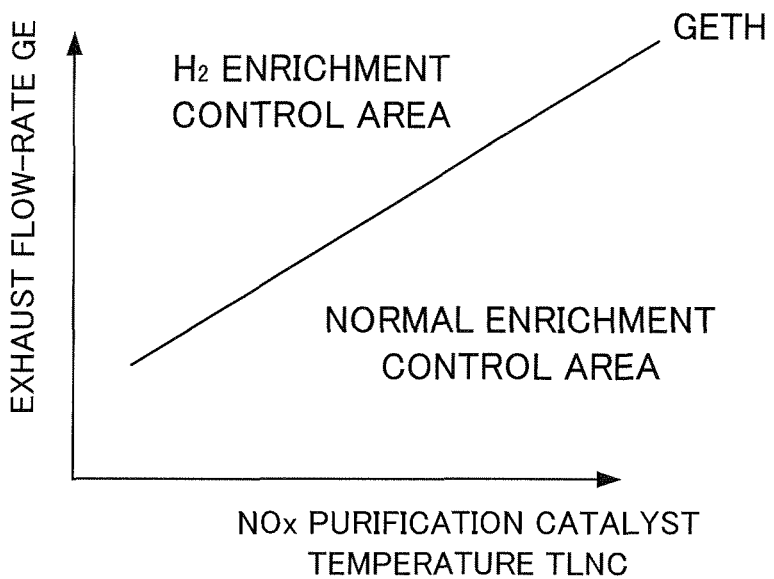
FIG. 9 is a graph showing a relationship between catalyst temperature and a flow-rate judgment value according to the embodiment.

FIG. 9 is a graph showing a relationship between the catalyst temperature TLNC and the flow-rate judgment value GETH. In FIG. 9, the horizontal axis shows the catalyst temperature TLNC and the vertical axis shows the exhaust flow-rate GE.

The flow-rate judgment value GETH is a value judging whether to execute $H_2$ enrichment control or normal enrichment control based on the exhaust flow-rate GE, and in a case of GE≧GETH, $H_2$ enrichment control is executed, and in a case of GE<GETH, normal enrichment control is executed. In addition, this flow-rate judgment value GETH becomes large substantially in proportion to the catalyst temperature TLNC.

Referring again to FIG. 7, in Step S16, the target value HAFTV of the exhaust air/fuel ratio during $H_2$ enrichment control is determined based on the exhaust flow-rate GE, and Step S17 is advanced to.

In Step S17, $H_2$ enrichment control is executed according to the exhaust air/fuel ratio target value HAFTV. More specifically, the exhaust air/fuel ratio is enriched so that the exhaust air/fuel ratio AFA detected by the UEGO sensor matches the exhaust air/fuel ratio target value HAFTV by supplying reductive gas from the fuel reformer into the exhaust plumbing and adjusting the supply amount of reductive gas.

In Step S18, the target value NAFTV of the exhaust air/fuel ratio during normal enrichment control is determined based on the exhaust flow-rate GE, and Step S19 is advanced to. In addition, herein, the exhaust air/fuel ratio target value NAFTV during normal enrichment control is set to a value that is different from the exhaust air/fuel ratio target value HAFTV during $H_2$ enrichment control.

In Step S19, normal enrichment control is executed according to the exhaust air/fuel ratio target value NAFTV. More specifically, the exhaust air/fuel ratio is enriched so that the exhaust air/fuel ratio AFA detected by the UEGO sensor matches the exhaust air/fuel ratio target value NAFTV by enriching the engine air/fuel ratio.

As explained in detail above, according to the present embodiment, whether to enrich the exhaust air/fuel ratio while supplying reducing gas containing hydrogen and carbon monoxide into the exhaust plumbing 4 or to enrich the exhaust air/fuel ratio without supplying this reducing gas when enriching the exhaust air/fuel ratio is selected depending on predetermined conditions. For example, even in a state in which it is difficult for the reduction reaction to occur in the NOx purification catalyst 33, this promotes the reduction reaction of the NOx purification catalyst 33 and can prevent NOx from discharging without being reduced by enriching the exhaust air/fuel ratio while supplying reducing gas containing hydrogen, which has a high reaction rate compared to hydrocarbons. Therefore, the NOx purification performance can be prevented from declining depending on the operating state of the engine 1.

In addition, by supplying reducing gas into the exhaust plumbing 4, the exhaust air/fuel ratio of exhaust flowing into the NOx purification catalyst can be richened while keeping the engine air/fuel ratio lean and maintaining combustion in the internal combustion engine in an optimal state. Therefore, NOx purification performance can be improved irrespective of the operating state of the internal combustion engine. In addition, herein, since the engine air/fuel ratio can be kept lean, oil dilution such as in a case in which the exhaust air/fuel ratio fluctuates by supplying fuel because of post injection or the like does not occur, and combustion in the internal combustion engine does not become unstable.

Moreover, by providing the fuel reformer 50A that produces reducing gas to be separate from the exhaust plumbing 4, it is always possible to produce reducing gas at optimum efficiency irrespective of the operating state of the engine 1, oxygen concentration and steam concentration of the exhaust, etc., and this reducing gas can be supplied into the exhaust plumbing 4. In addition, it becomes possible to supply reducing gas in response to requirements such as the operating state of the engine 1 by providing the fuel reformer 50A to be separate from the exhaust plumbing 4.

On the other hand, in a case of providing the fuel reformer 50A inside the exhaust plumbing 4, it is necessary to enlarge the fuel reformer 50A so as to be able to operate without influencing the components, temperature, and flow rate of the exhaust; however, according to the present invention, it is possible to perform operation stably without enlarging the device by providing the fuel reformer 50A to be separate from the exhaust plumbing 4. In addition, by providing the fuel reformer 50A to be separate from the exhaust plumbing 4, it becomes possible to activate the reforming catalyst 53 provided to the fuel reformer 50A at an early stage by performing control of an independent system from the control of the engine 1.

Furthermore, the reduction reaction rate in the NOx purification catalyst 33 can be improved by supplying reducing gas containing hydrogen. This can prevent desorption without the NOx adsorbed or occluded to the NOx purification catalyst being reduced when the exhaust air/fuel ratio is made rich.

In addition, according to the present embodiment, in a case in which the NOx purification rate CE of the NOx purification catalyst 33 is estimated and this NOx purification rate CE is smaller than a first purification rate judgment value CEATH, the exhaust air/fuel ratio is enriched by supplying reducing gas. This makes it possible for the amount of NOx adsorbed or occluded to the NOx purification catalyst 33 to increase, and thus the amount of NOx discharging without being reduced when enriching to be reduced.

In addition, according to the present embodiment, in a case in which the exhaust flow-rate GE is estimated and this exhaust flow-rate GE is at least a flow-rate judgment value GETH, the exhaust air/fuel ratio is enriched by supplying reducing gas. In other words, in a case in which the exhaust flow-rate is large, although it becomes easy for NOx adsorbed or occluded to the NOx purification catalyst 33 to desorb, even in such a case, NOx can be prevented from discharging downstream without being reduced by promoting the reduction reaction in the NOx purification catalyst 33 by supplying reducing gas.

In addition, according to the present embodiment, the temperature TLNC of the NOx purification catalyst 33 is estimated, and the flow-rate judgment value GETH described above is determined based on this temperature TLNC. Incidentally, it becomes difficult for the reduction reaction of the NOx purification catalyst 33 to occur with the temperature of the NOx purification catalyst 33 becoming low, and thus it becomes easy for NOx to discharge without being reduced. According to the present invention, the NOx purification performance can be improved more effectively by determining the flow-rate judgment value GETH by taking into account the temperature TLNC of the NOx purification catalyst 33.

In addition, according to the present embodiment, the target value HAFTV, NAFTV is determined based on the exhaust flow-rate GE thus estimated, and the exhaust air/fuel ratio AFA is enriched so as to match this exhaust air/fuel ratio target value HAFTV, NAFTV. In this way, NOx can be more effectively prevented from discharging from this NOx purification catalyst 33 without being reduced by adjusting the exhaust air/fuel ratio when enriching according to the exhaust flow-rate.

In addition, according to the present embodiment, in a case of enriching the exhaust air/fuel ratio by supplying reducing gas, the supply amount GRG of reducing gas is adjusted so that the exhaust air/fuel ratio AFA matches the target value HAFTV, NAFTV. This can cause exhaust of the optimum air/fuel ratio to always be flowed into the NOx purification catalyst 33.

In the present embodiment, the ECU 40A is configured with an enrichment means, a first enrichment control means, a second enrichment control means, a portion of a purification rate estimation means, a portion of an exhaust flow-rate estimation means, a portion of a catalyst temperature estimation means, a flow-rate judgment value determination means, and an exhaust air/fuel ratio target value determination means. More specifically, the means related to Steps S11 to S19 of FIG. 7 correspond to the enrichment means, the means related to Step S17 correspond to the first enrichment control means, the means related to Step S19 correspond to the second enrichment control means, the means related to Step S11, the upstream NOx sensor 27, and downstream NOx sensor 28 correspond to the purification rate estimation means, the means related to Step S15 and the air-flow meter 21 correspond to the exhaust flow-rate estimation means, the means related to Step S14 and the exhaust temperature sensor 22 correspond to the catalyst temperature estimation means, the means related to Step S14 correspond to the flow-rate judgment value determination means, and the means related to Steps S16 and S18 correspond to the exhaust air/fuel ratio target value determination means.

It should be noted that various modifications to the embodiment described above are possible.

For example, in the above-mentioned embodiment, although the temperature TLNC of the NOx purification catalyst 33 was estimated based on the exhaust temperature TE detected by the exhaust temperature sensor 22, it is not limited thereto, and may be detected directly. In addition, in the above-mentioned embodiment, although the flow-rate GE of exhaust flowing through the exhaust plumbing 4 was estimated based on the intake air flow-rate GA detected by the air-flow meter 21, it is not limited thereto, and may be detected directly.

Moreover, in the above-mentioned embodiment, although the target value HAFTV, NAFTV of the exhaust air/fuel ratio was determined based on the exhaust flow-rate GE in Steps S16 and S18, it is not limited thereto. For example, these target values may be determined based on the temperature of the NOx purification catalyst. Even in such a case, effects similar to the above-mentioned embodiment can be exerted.

Third Embodiment

A third embodiment of the present invention is explained below while referring to the drawings. In the explanation of the third embodiment below, constitutional requirements identical to the first embodiment are assigned the same reference symbol, and explanations thereof are omitted or simplified.

Figure 10:
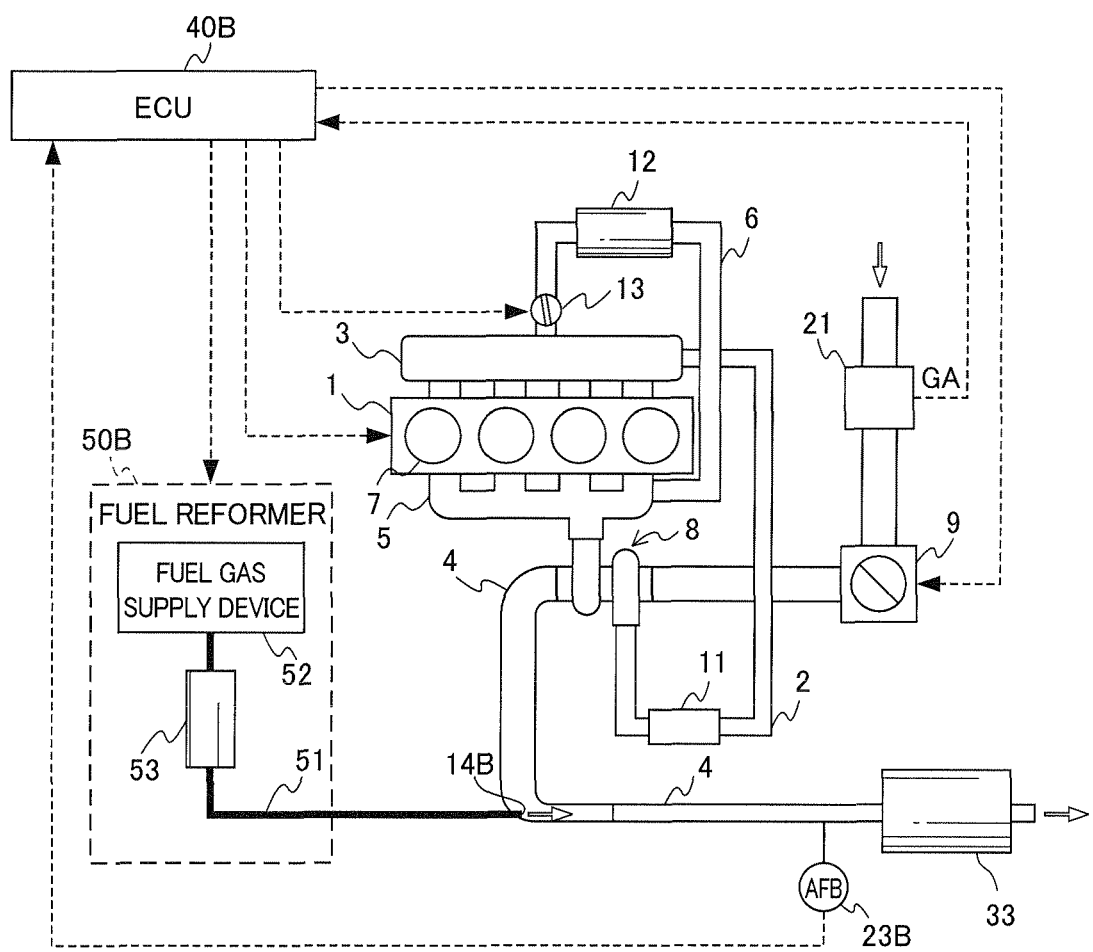
FIG. 10 is a view showing a configuration of an internal combustion engine and an exhaust purification device thereof according to a third embodiment of the present invention.

FIG. 10 is a view showing a configuration of the engine 1 and an exhaust purification device thereof according to the third embodiment of the present invention. The third embodiment is mainly different from the first embodiment in the configuration of a fuel reformer 50B and the configuration of an ECU 40B.

In the present embodiment, the fuel reformer 50B is connected into the exhaust plumbing 4 upstream of the NOx purification catalyst 33. In other words, reductive gas produced by the fuel reformer 50B is supplied from an inlet 14B formed in the exhaust plumbing 4 upstream of the NOx purification catalyst 33 into the exhaust plumbing 4.

A UEGO sensor 23B that detects the oxygen concentration of exhaust flowing in the exhaust plumbing 4 between the inlet 14B and the NOx purification catalyst 33, i.e. an exhaust air/fuel ratio AFB, is connected to the ECU 40B, and a detection signal of this sensor is supplied to the ECU 40B.

The engine 1 is normally operated by setting the engine air/fuel ratio to be leaner than the stoichiometric ratio, and a SOx regeneration process to purify SOx adsorbed to the NOx purification catalyst is executed periodically by the ECU 40B by setting the exhaust air/fuel ratio to be richer than the stoichiometric ratio.

Figure 11:
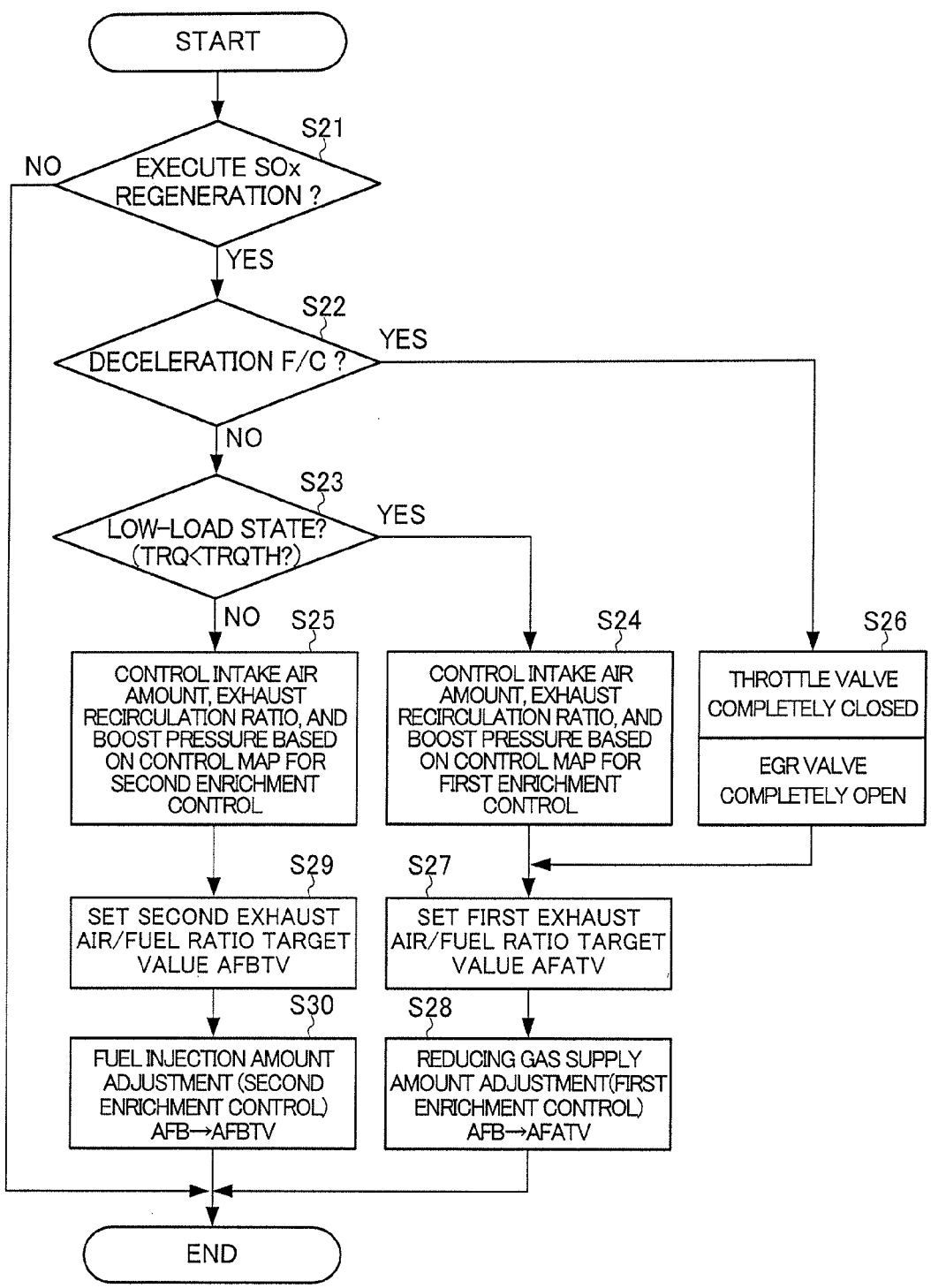
FIG. 11 is a flowchart showing a sequence of a SOx regeneration process by an ECU according to the embodiment.

FIG. 11 is a flowchart showing a sequence of the SOx regeneration process by the ECU. As shown in FIG. 11, in the SOx regeneration process, first enrichment control that enriches the exhaust air/fuel ratio by supplying reductive gas produced by the fuel reformer, and second enrichment control that enriches the exhaust air/fuel ratio by controlling the engine air/fuel ratio become selectively executable according to predetermined conditions.

In Step S21, it is determined whether to execute the SOx regeneration process. In a case of this determination being YES, Step S22 is advanced to, and in a case of being NO, this process is ended immediately. Herein, for example, the decision on whether to execute the SOx regeneration process is preformed based on the SOx poisoning amount of the NOx purification catalyst, the NOx purification rate of the NOx purification catalyst, etc.

In Step S22, it is determined whether the engine is in a deceleration fuel-cut state in which the injection of fuel has been suspended with the deceleration operation thereof. In a case of this determination being YES, Step S26 is advanced to, and in a case of being NO, Step S23 is advanced to.

In Step S23, it is determined whether the engine is in a low-load operating state, i.e. whether the demanded torque TRQ is smaller than a predetermined torque judgment value TRQTH. In a case of this determination being YES, Step S24 is advanced to, and in a case of being NO, Step S25 is advanced to.

Figure 12:
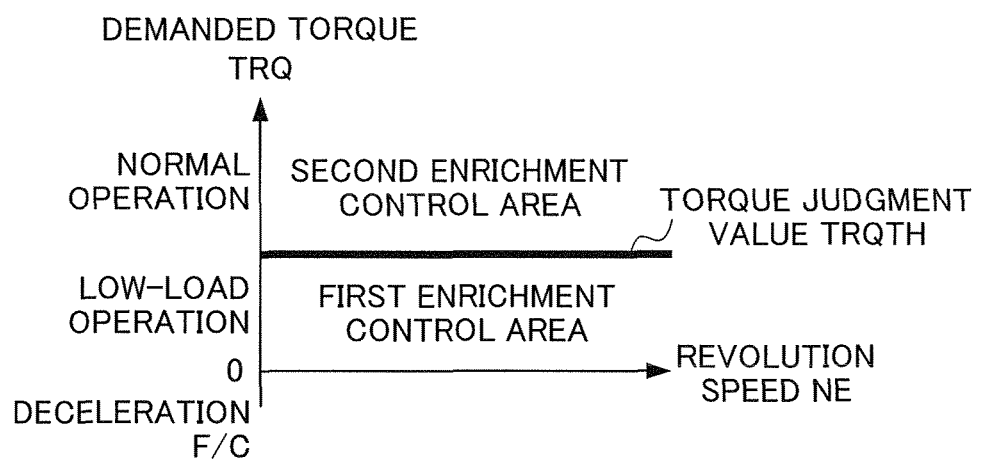
FIG. 12 is a graph showing a relationship between a torque judgment value and engine revolution speed according to the embodiment.

FIG. 12 is a graph showing a relationship between the torque judgment value TRQTH and the engine revolution speed NE.

As shown in FIG. 12, the torque judgment value TRQTH is determined based on the revolution speed NE of the engine. In addition, in a case in which the demanded torque TRQ is smaller than this torque judgment value TRQTH, it is determined to be in a low-load operating state and first enrichment control is executed, and in a case in which the demanded torque TRQ is at least the torque judgment value TRQTH, it is determined to be in a normal operating state and second enrichment control is executed.

Referring again to FIG. 11, in Step S24, the intake air amount, exhaust recirculation ratio, and boost pressure are controlled based on the control map for first enrichment control, which is not illustrated, and Step S27 is advanced to.

In Step S25, the intake air amount, exhaust recirculation ratio, and boost pressure are controlled based on a control map for second enrichment control, which is not illustrated, and Step S29 is advanced to.

In Step S26, in response to being determined to be in the deceleration fuel-cut state, the intake air amount is minimized by completely closing the throttle valve and the exhaust recirculation ratio is maximized by completely opening the EGR valve, and Step S27 is advanced to.

In Step S27, a first exhaust air/fuel ratio target value AFATV, which is a target value of the exhaust air/fuel ratio when executing first enrichment control is set, and Step S28 is advanced to. Herein, this first exhaust air/fuel ratio target value AFATV is set to a value that is larger than a second exhaust air/fuel ratio target value AFBTV described later.

In Step S28, the first enrichment control, which enriches the exhaust air/fuel ratio by supplying reductive gas produced by the fuel reformer into the exhaust plumbing, is executed, and this process is ended. More specifically, in this first enrichment control, reductive gas is supplied while a supply amount of this reductive gas is adjusted so that the exhaust air/fuel ratio AFB detected by the UEGO sensor matches the first exhaust air/fuel ratio target value AFATV.

In addition, herein, oxygen is preferably contained in the exhaust flowing through the exhaust plumbing while supplying reductive gas into this exhaust plumbing.

In Step S29, the second exhaust air/fuel ratio target value AFBTV, which is a target value of the exhaust air/fuel ratio when executing second enrichment control, is set, and Step S30 is advanced to.

In Step S30, second enrichment control, which enriches the exhaust air/fuel ratio by making the engine air/fuel ratio rich, is executed, and this process is ended. More specifically, in this second enrichment control, the fuel injection amount is adjusted so that the exhaust air/fuel ratio AFB detected by the UEGO sensor matches the second exhaust air/fuel ratio target value AFBTV.

As explained in detail above, according to the present invention, in a case of determining that the demanded torque TRQ is smaller than the torque judgment value TRQTH when executing the SOx regeneration process of the NOx purification catalyst 33, the exhaust air/fuel ratio is enriched by supplying reductive gas into the exhaust plumbing 4, and in a case of determining that the demanded torque TRQ is at least the torque judgment value TRQTH, the exhaust air/fuel ratio is enriched without supplying reductive gas into the exhaust plumbing 4. This can maintain the exhaust air/fuel ratio at or below the stoichiometric ratio by enriching with reductive gas, even in a case in which the demanded torque TRQ is smaller than the torque judgment value TRQTH. That is, in a case of controlling the exhaust air/fuel ratio by the method of combustion rich as described above, it is difficult to maintain the exhaust air/fuel ratio to at or below the stoichiometric ratio during low-load operation in particular. According to the present embodiment, the time consumed in the SOx regeneration process can be shortened and deterioration of the NOx purification catalyst 33 and degradation to fuel economy can be reduced compared to a case of performing the SOx regeneration process by the method of combustion rich. Therefore, the SOx regeneration process of the NOx purification catalyst 33 can be executed stably irrespective of the operating state.

In addition, by using such a reductive gas, the exhaust air/fuel ratio can be controlled without supplying uncombusted fuel such as in exhaust injection or post injection. This enables issues such as the occurrence of coking, degradation or corrosion of the catalyst or components of the exhaust plumbing 4, deterioration of fuel economy, and the occurrence of oil dilution as described above to be avoided.

In addition, the molecular diameter of carbon monoxide and hydrogen contained in the reductive gas is small compared to the molecular diameter of hydrocarbons supplied by exhaust injection and post injection. As a result, even in a case in which a DPF is provided upstream of the NOx purification catalyst 33 and, for example, a large amount of PM has deposited on this DPF, SOx can be purified by supplying reductive gas to the NOx purification catalyst 33 downstream of the DPF.

In addition, reductive gas can be supplied without adding heat capacity upstream of the NOx purification catalyst 33 by providing the fuel reformer 50B to be separate from the exhaust plumbing 4. This allows the SOx regeneration process to be performed without reducing the NOx purification performance while at low temperatures such as immediately after engine startup. Therefore, the NOx purification performance by the NOx purification catalyst 33 can be prevented from declining depending on the operation state of the engine 1.

In addition, by providing the fuel reformer 50B that produces reductive gas to be separate from the exhaust plumbing 4, the execution time of the SOx regeneration process can be decided independently from the state of the engine 1. Therefore, the SOx regeneration process can be suitably executed while always controlling the engine 1 to the optimum state. Moreover, by providing the fuel reformer 50B to be separate from the exhaust plumbing 4, reductive gas can always be produced at optimum efficiency irrespective of the operating state of the engine 1, the oxygen concentration or steam concentration of the exhaust, etc., and this reductive gas can be supplied into the exhaust plumbing 4. On the other hand, in a case of providing the fuel reformer 50B inside the exhaust plumbing 4, it is necessary to enlarge the fuel reformer 50B so as to be able to operate without influencing the components, temperature, and flow rate of the exhaust; however, according to the present invention, it is possible to perform operation stably without enlarging the device by providing the fuel reformer 50B to be separate from the exhaust plumbing 4.

In addition, by providing the fuel reformer 50B to be separate from the exhaust plumbing 4, it becomes possible to activate the reforming catalyst 53 at an early stage by performing control of an independent system from the control of the engine 1.

In addition, according to the present embodiment, more carbon monoxide than hydrogen is contained in the reductive gas. Moreover, the temperature at which carbon monoxide gas begins to combust on the catalyst is a lower temperature than hydrogen. In the SOx regeneration process, the NOx purification catalyst 33 is quickly raised in temperature by supplying such a reducing gas containing carbon monoxide, and thus the purification of SOx can be promoted.

In addition, reducing gas thus produced can be supplied into the exhaust plumbing 4 without adding an extra device by producing reducing gas of a pressure higher than atmospheric.

Moreover, according to the present embodiment, the UEGO sensor is provided that detects the oxygen concentration flowing between the inlet 14B and the NOx purification catalyst 33. This enables the oxygen concentration of the exhaust flowing into the NOx purification catalyst 33 to be controlled to the predetermined target value with good accuracy. In addition, an excessive rise in temperature of the NOx purification catalyst 33 can be prevented by controlling the oxygen concentration of the exhaust flowing into the NOx purification catalyst 33. Moreover, it becomes possible to make the start of the SOx regeneration process quick, i.e. quickly raise the temperature of the NOx purification catalyst 33 up to a predetermined target temperature, by performing control to prevent such an excessive rise in temperature.

Furthermore, according to the present embodiment, the torque judgment value TRQTH is determined based on the revolution speed NE. This enables the decision of whether to enrich by supplying reductive gas to the exhaust plumbing 4 when executing the SOx regeneration process to be determined more appropriately according to the state of the engine 1.

In addition, according to the present embodiment, in a case of executing the first enrichment control and the second enrichment control, the exhaust air/fuel ratio AFB is controlled so as to match the first exhaust air/fuel ratio target value AFATV and the second exhaust air/fuel ratio target value AFBTV, respectively. Moreover, herein, AFATV is larger than AFBTV. This enables the exhaust flowing into the NOx purification catalyst 33 to be controlled to an exhaust air/fuel ratio that is appropriate for performing the SOx regeneration process in a case of supplying reductive gas and in a case of not supplying reductive gas.

In addition, according to the present embodiment, in a case of executing the first enrichment control, the exhaust air/fuel ratio AFB is controlled so as to match the first exhaust air/fuel ratio target value AFATV by adjusting the supply amount of reductive gas, and in a case of executing the second enrichment control, the exhaust air/fuel ratio AFB is controlled so as to match the second exhaust air/fuel ratio target value AFBTV by adjusting the fuel injection amount. This enables the exhaust flowing into the NOx purification catalyst 33 to be controlled to an exhaust air/fuel ratio that is appropriate for performing the SOx regeneration process.

In addition, according to the present embodiment, the intake air amount, exhaust recirculation ratio, and boost pressure are controlled while executing the SOx regeneration process. This enables the exhaust flowing into the NOx purification catalyst 33 to be controlled to an exhaust air/fuel ratio that is appropriate for performing the SOx regeneration process.

Moreover, according to the present embodiment, in a case of the engine 1 performing deceleration fuel-cut, at least one among completely closing the throttle valve 9 and completely opening the EGR valve 13 is performed, and furthermore, the exhaust air/fuel ratio is enriched by supplying reductive gas. This enables the exhaust air/fuel ratio of the exhaust flowing into the NOx purification catalyst 33 to be maintained at or below the stoichiometric ratio while performing deceleration fuel-cut, and for the SOx regeneration process to be continued. Therefore, the time consumed in the SOx regeneration process can be further shortened and deterioration of the fuel economy can be reduced.

In the present embodiment, the ECU 40B is configures configured with the regeneration means, torque judgment means, first enrichment means, second enrichment means, intake control means, and deceleration judgment means. More specifically, the means related to Steps S21 to S30 of FIG. 11 correspond to the regeneration means, the means related to Step S23 correspond to the torque judgment means, the means related to Steps S27 and S28 correspond to the first enrichment means, the means related to Steps S29 and S30 correspond to the second enrichment means, the means related to Steps S24 to S26 correspond to the intake control means, and the means related to Step S22 correspond to the deceleration judgment means.

It should be noted that the present invention is not to be limited to the first to third embodiments described above, and various modifications are possible.

For example, in the above-mentioned first to third embodiments, although an example is shown in which the present invention is applied to a diesel internal combustion engine, the present invention can also be applied to a gasoline internal combustion engine. In addition, the present invention can be applied to an exhaust purification device of an engine for nautical propulsion such as an outboard engine in which the crank shaft is arranged vertically, or the like.

The invention claimed is:

1. An exhaust purification device of an internal combustion engine including a NOx purification catalyst that is provided in an exhaust channel of the internal combustion engine and that, with an air/fuel ratio of exhaust flowing in the exhaust channel as an exhaust air/fuel ratio, adsorbs or occludes NOx in exhaust when the exhaust air/fuel ratio is made lean, and reduces the NOx adsorbed or occluded when the exhaust air/fuel ratio is made rich, the exhaust purification device comprising:
a catalytic converter that is provided in the exhaust channel, and continuously reduces NOx in exhaust using a reducing gas;
a fuel reformer that is provided separately from the exhaust channel, produces a reducing gas containing hydrogen and carbon monoxide by reforming fuel, and supplies the reducing gas from an inlet provided in the exhaust channel upstream of the NOx purification catalyst and the catalytic converter into the exhaust channel;
an operating state detection means for detecting an operating state of the internal combustion engine;
an exhaust recirculation ratio estimation means for estimating an exhaust recirculation ratio of the internal combustion engine; and
an electronic control unit configured to enrich the exhaust air/fuel ratio by selectively executing i) $H_2$ enrichment control that enriches the exhaust air/fuel ratio while supplying reducing gas from the fuel reformer into the exhaust channel, and ii) normal enrichment control that enriches the exhaust air/fuel ratio without supplying reducing gas from the fuel reformer into the exhaust channel,
wherein the electronic control unit is configured to execute the $H_2$ enrichment control, in a case of an operating state detected by the operating state detection means being a high-load operating state or in a case of the exhaust recirculation ratio estimated by the exhaust recirculation ratio estimation means being smaller than a predetermined judgment value, and to execute the normal enrichment control, in a case of the detected operating state not being the high-load operating state and the estimated exhaust recirculation ratio being at least the predetermined judgment value.

2. An exhaust purification device of an internal combustion engine according to claim 1, wherein the catalytic converter is provided further upstream in the exhaust channel than the NOx purification catalyst.

3. An exhaust purification device of an internal combustion engine according to claim 2, further comprising an exhaust air/fuel ratio detection means for detecting or estimating an exhaust air/fuel ratio in the exhaust channel between the inlet and the catalytic converter,
wherein the electronic control unit adjusts a supply amount of reducing gas so that the exhaust air/fuel ratio detected or estimated by the exhaust air/fuel ratio detection means matches a predetermined target value, in a case of executing the $H_2$ enrichment control.

4. An exhaust purification device of an internal combustion engine according to claim 3, wherein the predetermined target value differs in a case of executing the $H_2$ enrichment control, and in a case of executing the normal enrichment control.

5. An exhaust purification device of an internal combustion engine according to claim 1, wherein the catalytic converter contains ceria, platinum, and rhodium.

6. An exhaust purification device of an internal combustion engine according to claim 1, wherein the fuel reformer produces reducing gas that is at a pressure higher than atmospheric pressure and in which carbon monoxide is a main component by way of a partial oxidation reaction of hydrocarbon fuel and air.

7. An exhaust purification device of an internal combustion engine including a NOx purification catalyst that is provided in an exhaust channel of the internal combustion engine and that, with an air/fuel ratio of exhaust flowing in the exhaust channel as an exhaust air/fuel ratio, adsorbs or occludes NOx in exhaust when the exhaust air/fuel ratio is made lean, and reduces the NOx adsorbed or occluded when the exhaust air/fuel ratio is made rich, the exhaust purification device comprising:
a fuel reformer that is provided separately from the exhaust channel, produces a reducing gas containing hydrogen and carbon moNOxide by reforming fuel, and supplies the reducing gas from an upstream side in the exhaust channel of the NOx purification catalyst into the exhaust channel;
a purification rate estimating means for estimating a NOx purification rate of the NOx purification catalyst;
an exhaust flow-rate estimating means for estimating or detecting, with a flow-rate of exhaust flowing through the exhaust channel as an exhaust flow-rate, the exhaust flow-rate; and
an electronic control unit configured to enrich the exhaust air/fuel ratio,
wherein the electronic control unit includes
first enrichment control that enriches the exhaust air/fuel ratio while supplying reducing gas from the fuel reformer into the exhaust channel, and second enrichment control that enriches the exhaust air/fuel ratio without supplying reducing gas from the fuel reformer into the exhaust channel, and selects whether to enrich the exhaust air/fuel ratio by way of the first enrichment control or to enrich by way of the second enrichment control based on a predetermined condition;

wherein the electronic control unit enriches the exhaust air/fuel ratio by executing the first enrichment control, in a case of the estimated NOx purification rate being smaller than a predetermined purification rate judgment value or in a case of the estimated or detected exhaust flow-rate being at least a predetermined flow-rate judgment value, and enriches the exhaust air/fuel ratio by executing the second enrichment control, in a case of the estimated NOx purification rate being no smaller than the predetermined purification rate and the estimated or detected exhaust flow-rate being smaller than the predetermined flow-rate judgment value.

8. An exhaust purification device of an internal combustion engine according to claim 7, further comprising:
 a catalyst temperature estimation means for estimating or detecting, with a temperature of the NOx purification catalyst as a catalyst temperature, the catalyst temperature; and
 a flow-rate judgment value determination means for determining the predetermined flow-rate judgment value based on the catalyst temperature estimated or detected by the catalyst temperature estimation means.

9. An exhaust purification device of an internal combustion engine according to claim 7, further comprising:
 a catalyst temperature estimation means for estimating or detecting, with a temperature of the NOx purification catalyst as a catalyst temperature, the catalyst temperature; and
 an exhaust air/fuel ratio target value determination means for determining a target value of the exhaust air/fuel ratio when enriching the exhaust air/fuel ratio by way of the first enrichment control and the second enrichment control, based on the exhaust flow-rate estimated or detected by the exhaust flow-rate estimation means, or on the catalyst temperature estimated or detected by the catalyst temperature estimation means,
 wherein the first enrichment control and the second enrichment control each enrich so that the exhaust air/fuel ratio matches a target value determined by the exhaust air/fuel ratio target value determination means.

10. An exhaust purification device of an internal combustion engine according to claim 9, wherein the first enrichment control enriches so that the exhaust air/fuel ratio matches a target value determined by the exhaust air/fuel ratio target value determination means, by adjusting a supply amount of reducing gas supplied from the fuel reformer.

11. An exhaust purification device of an internal combustion engine including a NOx purification catalyst that is provided in an exhaust channel of the internal combustion engine and that, with an air/fuel ratio of exhaust flowing in the exhaust channel as an exhaust air/fuel ratio, adsorbs or occludes NOx in exhaust when the exhaust air/fuel ratio is made lean, and reduces the NOx adsorbed or occluded when the exhaust air/fuel ratio is made rich, the exhaust purification device comprising:
 a fuel reformer that is provided separately from the exhaust channel, produces a reducing gas containing hydrogen and carbon moNOxide by reforming fuel, and supplies the reducing gas from an inlet provided in the exhaust channel upstream of the NOx purification catalyst into the exhaust channel; and an electronic control unit configured to execute a Sox regeneration process of the NOx purification catalyst by enriching the exhaust air/fuel ratio, wherein the electronic control unit is configured to:
 execute a torque judgment process that judges whether a demanded torque of the internal combustion engine is smaller than a predetermined torque judgment value;
 execute a first enrichment process that enriches the exhaust air/fuel ratio by supplying reducing gas produced by the fuel reformer into the exhaust channel, in a case of being judged by the torque judgment process that the demanded torque is less than the torque judgment value; and
 execute a second enrichment process that enriches the exhaust air/fuel ratio without supplying reducing gas produced by the fuel reformer into the exhaust channel, in a case of being judged by the torque judgment process that the demanded torque is at least the torque judgment value.

12. An exhaust purification device of an internal combustion engine according to claim 11, wherein reducing gas produced by the fuel reformer is at a pressure higher than atmospheric pressure and contains more carbon monoxide than hydrogen by volume ratio.

13. An exhaust purification device of an internal combustion engine according to claim 11, wherein oxygen is contained in exhaust flowing through the exhaust channel when reducing gas from the fuel reformer is introduced into the exhaust channel.

14. An exhaust purification device of an internal combustion engine according to claim 11, further comprising an oxygen concentration detection means for detecting an oxygen concentration of exhaust flowing through the exhaust channel between the inlet and the NOx purification catalyst.

15. An exhaust purification device of an internal combustion engine according to claim 11, wherein the torque judgment value is determined based on a revolution speed of the internal combustion engine.

16. An exhaust purification device of an internal combustion engine according to claim 11 wherein the first enrichment process and the second enrichment process control the exhaust air/fuel ratio so as to match a predetermined first exhaust air/fuel ratio target value and a second air/fuel ratio target value, respectively, and
 wherein the first exhaust air/fuel ratio target value is larger than the second exhaust air/fuel ratio target value.

17. An exhaust purification device of an internal combustion engine according to claim 16, wherein the first enrichment process controls the exhaust air/fuel ratio so as to match the first exhaust air/fuel ratio target value, by adjusting a supply amount of reducing gas from the fuel reformer.

18. An exhaust purification device of an internal combustion engine according to claim 16, wherein the second enrichment process controls the exhaust air/fuel ratio so as to match the second exhaust air/fuel ratio target value, by adjusting a fuel injection amount of the internal combustion engine.

19. An exhaust purification device of an internal combustion engine according to claim 11, further comprising an intake control means for controlling an intake air amount, exhaust recirculation ratio, and boost pressure of the internal combustion engine when enriching the exhaust air/fuel ratio by way of the first enrichment process and the second enrichment process.

20. An exhaust purification device of an internal combustion engine according to claim 19, further comprising a deceleration judgment means for judging whether the internal combustion engine is in a state in which injection of fuel has been suspended in accordance with a deceleration state thereof, wherein the first enrichment process enriches the exhaust air/fuel ratio by supplying reducing gas from the fuel reformer into the exhaust channel, in a case of being judged by the deceleration judgment means to be in a state in which the injection of fuel has been suspended, and wherein the intake control means performs at least one among control to minimize the intake air amount, and control to maximize the exhaust recirculation ratio, in a case of being judged by the deceleration judgment means to be in a state in which the injection of fuel has been suspended.

21. An exhaust purification device of an internal combustion engine including a NOx purification catalyst that is provided in an exhaust channel of the internal combustion engine and that, with an air/fuel ratio of exhaust flowing in the exhaust channel as an exhaust air/fuel ratio, adsorbs or occludes NOx in exhaust when the exhaust air/fuel ratio is made lean, and reduces the NOx adsorbed or occluded when the exhaust air/fuel ratio is made rich, the exhaust purification device comprising:

a catalytic converter that is provided in the exhaust channel upstream of the NOx purification catalyst, and continuously reduces NOx in exhaust using a reducing gas;

a fuel reformer that is provided separately from the exhaust channel, produces a reducing gas containing hydrogen and carbon monoxide by reforming fuel, and supplies the reducing gas from an inlet provided in the exhaust channel upstream of the NOx purification catalyst and the catalytic converter into the exhaust channel;

an operating state detection means for detecting an operating state of the internal combustion engine;

an exhaust air/fuel ratio detection means for detecting or estimating an exhaust air/fuel ratio in the exhaust channel between the inlet and the catalytic converter;

an electronic control unit configured to enrich the exhaust air/fuel ratio, by selectively executing i) $H_2$ enrichment control that enriches the exhaust air/fuel ratio while supplying reducing gas from the fuel reformer into the exhaust channel, and ii) normal enrichment control that enriches the exhaust air/fuel ratio without supplying reducing gas from the fuel reformer into the exhaust channel, wherein the electronic control unit is configured to execute the $H_2$ enrichment control, in a case of an operating state detected by the operating state detection means being a high-load operating state, wherein the electronic control unit adjusts a supply amount of reducing gas so that the exhaust air/fuel ratio detected or estimated by the exhaust air/fuel ratio detection means matches a predetermined target value, in a case of executing the $H_2$ enrichment control, and wherein the predetermined target value differs in a case of executing the $H_2$ enrichment control, and in a case of executing the normal enrichment control.

* * * * *